US011750093B1

(12) United States Patent
Han et al.

(10) Patent No.: US 11,750,093 B1
(45) Date of Patent: Sep. 5, 2023

(54) VOLTAGE CONVERSION CIRCUITS AND ELECTRONIC EQUIPMENT

(71) Applicant: Halo Microelectronics Co., Ltd., Foshan (CN)

(72) Inventors: Shuang Han, Foshan (CN); Rui Liu, Fremont, CA (US); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/893,514

(22) Filed: Aug. 23, 2022

(30) Foreign Application Priority Data

May 16, 2022 (CN) .......................... 202210529699.5

(51) Int. Cl.
*H02M 3/158* (2006.01)
*H02J 7/34* (2006.01)
*H02M 1/088* (2006.01)
*H02M 3/07* (2006.01)

(52) U.S. Cl.
CPC ............. *H02J 7/345* (2013.01); *H02M 1/088* (2013.01); *H02M 3/07* (2013.01); *H02M 3/072* (2021.05); *H02M 3/158* (2013.01); *H02J 2207/20* (2020.01); *H02J 2207/50* (2020.01)

(58) Field of Classification Search
CPC ............ H02M 3/02; H02M 3/04; H02M 3/10; H02M 3/145; H02M 3/155; H02M 3/156; H02M 3/158; H02M 3/1582
See application file for complete search history.

(56) References Cited

U.S. PATENT DOCUMENTS

| | | | |
|---|---|---|---|
| 9,793,813 B1 | 10/2017 | Marawi | |
| 2004/0000949 A1 | 1/2004 | Tsuchi | |
| 2017/0055322 A1 | 2/2017 | Jiang et al. | |
| 2018/0091054 A1 | 3/2018 | Oh et al. | |
| 2020/0204072 A1 | 6/2020 | Yang et al. | |
| 2021/0075323 A1 | 3/2021 | Jin et al. | |
| 2021/0194364 A1* | 6/2021 | Jung | H02J 7/007 |

(Continued)

FOREIGN PATENT DOCUMENTS

| | | |
|---|---|---|
| CN | 201750339 U | 2/2011 |
| CN | 102904437 A | 1/2013 |
| CN | 103259410 A | 8/2013 |

(Continued)

*Primary Examiner* — Gary L Laxton
(74) *Attorney, Agent, or Firm* — AP3 Law Firm PLLC

(57) ABSTRACT

The voltage conversion circuit includes an input terminal, an output terminal, a first energy storage branch, a second energy storage branch, a third energy storage branch and a controller. The input terminal is used to connect with the input power supply. The output terminal is used to connect to the load. The first energy storage branch is connected to the input terminal, the second energy storage branch and the third energy storage branch. The second energy storage branch is connected to the first energy storage branch. The three energy storage branches are connected to the output terminal. The first energy storage branch includes a first capacitor, a second capacitor, a first switch, a second switch, a third switch and a fourth switch. The controller is connected with the first terminals of the switches of the first energy storage branch, the second energy storage branch and the third energy storage branch.

15 Claims, 15 Drawing Sheets

(56) References Cited

U.S. PATENT DOCUMENTS

2021/0288576 A1* 9/2021 Rizzolatti ............. H02M 3/158

FOREIGN PATENT DOCUMENTS

| | | | |
|---|---|---|---|
| CN | 108809095 | A | 11/2018 |
| CN | 109889042 | A | 6/2019 |
| CN | 110247546 | A | 9/2019 |
| CN | 209948954 | U | 1/2020 |
| CN | 111181387 | A | 5/2020 |
| CN | 211744349 | U | 10/2020 |
| CN | 112019052 | A | 12/2020 |
| CN | 112953240 | A | 6/2021 |
| CN | 113328628 | A | 8/2021 |
| CN | 113824197 | A | 12/2021 |
| CN | 113839454 | A | 12/2021 |
| CN | 114006547 | A | 2/2022 |
| CN | 114301301 | A | 4/2022 |
| WO | 2014115618 | A1 | 7/2014 |
| WO | 2021218296 | A1 | 11/2021 |

* cited by examiner

VOLTAGE CONVERSION CIRCUITS AND ELECTRONIC EQUIPMENT

PRIORITY CLAIM

This application claims the benefit of and priority to Chinese Patent Application No. 2022105296995, filed on May 16, 2022, which is hereby incorporated by reference in its entirety.

TECHNICAL FIELD

The present application relates to the technical field of electronic circuits, and in particular, to a voltage conversion circuit and electronic equipment.

BACKGROUND

With the rapid popularization of cloud computing and big data centers, the consumption of electricity has also increased dramatically. In order to further improve the conversion efficiency and save energy, the bus voltage of the communication power supply is also gradually transitioning from 12 V to 48 V. As the power increases, the 48 V bus voltage can solve the problems of excessive loss, high cost and more complicated design of the current 12 V bus. However, it also poses new challenges to the design of the power system. One of the most prominent is how to efficiently convert the 48 V voltage into a lower voltage for CPU, DDR memory, etc., such as 1.0V-2.0V.

The traditional two-stage architecture uses LLC switching power supplies to convert 48 V to 12 V, and then cascades an existing 12 V bus poly-phase controller to achieve this. However, the conversion efficiency of this two-stage architecture is still not ideal. Taking the 12 V to 1 V conversion stage as an example, the existing technology often adopts the traditional step-down DC/DC structure, which makes all the power switches in the circuit need to withstand the input voltage of 12V, and at the same time need to output all the outputs current individually. This is not the most efficient use of power switching devices, and with it comes higher power losses and unsatisfactory voltage conversion efficiency.

SUMMARY

The present application aims to provide a voltage conversion circuit and an electronic device, which can improve the voltage conversion efficiency.

In order to achieve the above purpose, in a first aspect, the present application provides a voltage conversion circuit, comprising an input terminal, an output terminal, a first energy storage branch, a second energy storage branch, a third energy storage branch and a controller.

The input terminal is used to connect with the input power supply. The output terminal is used to connect to the load. The first terminal of the first energy storage branch is grounded, and the second terminal of the first energy storage branch is connected to the input terminal. The third terminal of the first energy storage branch is connected to the first terminal of the second energy storage branch, and the fourth terminal of the first energy storage branch is connected to the first terminal of the third energy storage branch. The second terminal of the second energy storage branch is connected to the third terminal of the third energy storage branch, and the third terminal of the second energy storage branch is connected to the second terminal of the third energy storage branch, and the fourth terminal of the second energy storage branch and the fourth terminal of the third energy storage branch are both connected to the output terminal.

The first energy storage branch includes a first capacitor, a second capacitor, a first switch, a second switch, a third switch and a fourth switch.

The first terminal of the first capacitor is grounded. The second terminal of the first capacitor is connected to the input terminal and the third terminal of the first switch, and the second terminal of the first switch is connected to the input terminal and the third terminal of the first switch. The third terminal of the second switch is connected to the first terminal of the second capacitor. The second terminal of the second switch is connected to the first terminal of the second energy storage branch, and the second terminal of the second capacitor is connected to the first terminal of the second energy storage branch. The second terminal of the second capacitor is connected to the third terminal of the third switch and the second terminal of the fourth switch. The second terminal of the third switch is grounded, and the third terminal of the fourth switch is connected to the first terminal of the third energy storage branches, wherein the first terminal of the first capacitor is the first terminal of the first energy storage branch, and the second terminal of the first capacitor is the second terminal of the first energy storage branch. The second terminal of the second switch is the third terminal of the first energy storage branch, and the third terminal of the fourth switch is the third terminal of the first energy storage branch.

The controller is connected to the first terminals of the switches of the first energy storage branch, the second energy storage branch and the third energy storage branch. The controller is used to control the switches respectively. The switch is turned on and off, so that the ratio between the voltage at the input terminal and the voltage at the output terminal is 2N:D, where N is an integer equal or greater than 2, and D is a first duty cycle of the signals output from the controller to control the first switch, the second switch, the third switch, and the fourth switch.

In an optional manner, when N is an even number greater than or equal to 2, the second energy storage branch includes a third capacitor, a first inductor, a fifth switch and a sixth switch, and the third energy storage branch includes a fourth capacitor, a second inductor, a seventh switch and an eighth switch.

The first terminal of the third capacitor is connected to the third terminal of the first energy storage branch and the third terminal of the fifth switch. The second terminal of the fifth switch is connected to the third terminal of the sixth switch, the second terminal of the fourth capacitor and the first terminal of the second inductor. The second terminal of the sixth switch is grounded. The second terminal of the third capacitor is connected to the first terminal of the first inductor, the second terminal of the seventh switch and the third terminal of the eighth switch. The second terminal of the first inductor is connected to the second terminal of the second inductor and the output terminal. The first terminal of the fourth capacitor is connected to the fourth terminal of the first energy storage branch and the third terminal of the seventh switch. The second terminal of the eighth switch is connected ground.

The first terminal of the third capacitor is the first terminal of the second energy storage branch. The second terminal of the third capacitor is the third terminal of the second energy storage branch. The second terminal of the fifth switch is the second terminal of the second energy storage branch. The second terminal of the first inductor is the fourth terminal of the second energy storage branch. The first terminal of the fourth capacitor is the first terminal of the third energy storage branch. The second terminal of the fourth capacitor is the third terminal of the third energy storage branch. The second terminal of the seventh switch is the second terminal of the third energy storage branch. The second terminal of the second inductor is the fourth terminal of the third energy storage branch.

When N is an odd number greater than or equal to 3, the second energy storage branch includes the third capacitor, the first inductor, the fifth switch, the sixth switch, the fifth capacitor and the ninth switch. The third energy storage branch includes the fourth capacitor, the second inductor, the seventh switch, the eighth switch, the sixth capacitor and the tenth switch.

The first terminal of the third capacitor is connected to the third terminal of the first energy storage branch and the third terminal of the ninth switch. The third terminal of the fifth switch is connected to the second terminal of the ninth switch and the first terminal of the fifth capacitor. The second terminal of the fifth capacitor is connected to the second terminal of the fourth capacitor, the first terminal of the second inductor, and the second terminal of the seventh switch and the third terminal of the eighth switch. The second terminal of the fifth switch is connected to the third terminal of the sixth switch, the first terminal of the first inductor, the second terminal of the third capacitor, the first terminal of the sixth capacitor. The second terminal of the sixth switch is grounded. The second terminal of the first inductor is connected to the second terminal of the second inductor and the output terminal. The first terminal of the fourth capacitor is connected to the third terminal of the tenth switch and the fourth terminal of the first energy storage branch. The third terminal of the seventh switch is connected to the second terminal of the sixth capacitor and the second terminal of the tenth switch. The second terminal of the eighth switch is grounded.

The first terminal of the third capacitor is the first terminal of the second energy storage branch. The second terminal of the third capacitor is the third terminal of the second energy storage branch. The second terminal of the fifth capacitor is the second terminal of the second energy storage branch. The second terminal of the first inductor is the fourth terminal of the second energy storage branch. The first terminal of the fourth capacitor is the first terminal of the third energy storage branch. The second terminal of the fourth capacitor is the third terminal of the third energy storage branch. The first terminal of the sixth capacitor is the second terminal of the third energy storage branch. The second terminal of the second inductor is the fourth terminal of the third energy storage branch.

The controller is connected with the first terminal of the fifth switch, the first terminal of the sixth switch, the first terminal of the seventh switch, the first terminal of the eighth switch, and the first terminal of the ninth switch and the first terminal of the tenth switch.

In an optional manner, the controller is further configured to do the following:

In a first operating state of an operating cycle, controlling the first switch, the fourth switch, the fifth switch, and the eighth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the sixth switch, and the seventh switch to be turned on, and controlling the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, and the seventh switch are all turned on and off alternately with the first duty cycle D, and the sixth switch and the eighth switch are alternately turned on and off with a second duty cycle (1-D) complementary to the first duty cycle D, so that the ratio between the voltage at the input terminal and the voltage at the output terminal is 2N:D, where N is an even number greater or equal to 2.

In an optional manner, the controller is further configured to do the following:

In a first operating state of an operating cycle, controlling the first switch, the fourth switch, the fifth switch, and the eighth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, and the sixth switch to be turned on, and controlling other switches to be turned off.

In a fourth operating state of the operating cycle, controlling the second switch, the third switch, the sixth switch, and the seventh switch to be turned on, and controlling the other switches to be turned off.

In the fifth operating state of the operating cycle, controlling the sixth switch and the eighth switch to be turned on, and controlling the other switches to be turned off.

In the sixth operating state of the operating cycle, controlling the first switch, the fourth switch, and the eighth switch to be turned on, and controlling the other switches to be turned off.

The first switch, the second switch, the third switch, and the fourth switch are alternately turned on and off with the first duty cycle D, and the sixth switch and the eighth switch are alternately turned on and off at a second duty cycle (1-D) that is complementary to the first duty cycle D. The fifth switch and the seventh switch are alternatively turned on and off with a third duty cycle that is smaller than the first duty cycle D, so that the ratio between the voltage at the input terminal and the voltage at the output terminal is 2N:D, and N is an even number equal or greater than 2.

In an optional manner, the controller is further configured to do the following:

In the first operating state of an operating cycle, controlling the first switch, the fourth switch, the sixth switch, the seventh switch, and the ninth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the fifth switch, the eighth switch, and the tenth switch to be turned on, and controlling the other switches to be turned off.

In a fourth operating state in the operating cycle, controlling the sixth switch and the eighth switch to be turned on, and controlling the other switches to be turned off.

The first switch, the second switch, the third switch, the fourth switch, the fifth switch, the seventh switch, the ninth switch and the tenth switch are all turned on and off alternately with the first duty cycle D. The sixth switch and the eighth switch are turn on and off alternatively at a second duty cycle (1-D) complementary to the first duty cycle D so that the ratio between the voltage at the input terminal and the voltage at the output terminal is 2N:D, where N is an odd number greater than or equal to 3.

In an optional manner, the controller is further configured to do the following:

In the first operating state of an operating cycle, controlling the first switch, the fourth switch, the sixth switch, the seventh switch, and the ninth switch to be turned on, and controlling the other switches to be turned off.

In a second operating state in the operating cycle, controlling the sixth switch and the eighth switch to be turned on, and controlling the other switches to be turned off.

In a third operating state in the operating cycle, controlling the second switch, the third switch, the eighth switch, and the tenth switch to be turned on, and controlling other switches to turn off.

In a fourth operating state in the operating cycle, controlling the second switch, the third switch, the fifth switch, the eighth switch, and the tenth switch to be turned on, and controlling the other switches to be turned off.

In a fifth operating state in the operating cycle, controlling the sixth switch and the eighth switch to be turned on, and controlling the other switches to be turned off.

In a sixth operating state in the operating cycle, controlling the first switch, the fourth switch, the sixth switch, and the ninth switch to be turned on, and controlling the other switches to be turned off.

The first switch, the second switch, the third switch, the fourth switch, the ninth switch and the tenth switch are all turned on and off alternately with the first duty cycle D. The sixth switch and the eighth switch are alternately turned on and off with a second duty cycle (1-D) complementary to the first duty cycle D, and the fifth switch and the seventh switch are alternately turned on and off with a third duty cycle that is smaller than the first duty cycle D, so that the ratio between the voltage at the input terminal and the voltage at the output terminal is 2N:D, where N is an odd number greater than or equal to 3.

In an optional manner, the second energy storage branch further includes a seventh capacitor, an eighth capacitor, an eleventh switch and a twelfth switch. The third energy storage branch further includes a ninth capacitor, a tenth capacitor, a thirteenth switch and a fourteenth switch.

The first terminal of the seventh capacitor is connected to the second terminal of the eleventh switch and the third terminal of the twelfth switch. The second terminal of the seventh capacitor is connected to the second terminal of the second inductor. The third terminal of the eleventh switch is connected to the first terminal of the third capacitor. The second terminal of the twelfth switch is connected to the first terminal of the eighth capacitor. The second terminal of the eighth capacitor is connected to the first terminal of the first inductor. The first terminal of the ninth capacitor is connected to the second terminal of the thirteenth switch and the third terminal of the fourteenth switch. The second terminal of the ninth capacitor is connected to the first terminal of the first inductor. The third terminal of the thirteenth switch is connected to the first terminal of the fourth capacitor. The second terminal of the fourteenth switch is connected to the first terminal of the tenth capacitor. The second terminal of the tenth capacitor is connected to the first terminal of the second inductor.

When N is an even number greater than or equal to 2, the second terminal of the twelfth switch is further connected to the third terminal of the fifth switch. The second terminal of the fourteenth switch is further connected to the third terminal of the seventh switch.

When N is an odd number greater than or equal to 3, the second terminal of the twelfth switch is further connected to the third terminal of the ninth switch. The second terminal of the fourteenth switch is further connected to the third terminal of the tenth switch.

The controller is connected to the first terminal of the eleventh switch, the first terminal of the twelfth switch, the first terminal of the thirteenth switch, and the first terminal of the fourteenth switch.

In an optional manner, the controller is further configured to do the following:

In a first operating state in an operating cycle, controlling the first switch, the fourth switch, the fifth switch, the eighth switch, the eleventh switch, and the fourteenth switch to be turn on, and controlling the other switches to be turn off.

In a second operating state in the operating cycle, controlling the sixth switch and the eighth switch to be turned on, and controlling the other switches to be turned off.

In a third operating state in the operating cycle, controlling the second switch, the third switch, the sixth switch, the seventh switch, the twelfth switch, and the thirteenth switch to be turn on, and controlling the other switches to be turned off.

In a fourth operating state in the operating cycle, controlling the sixth switch and the eighth switch to be turned on, and controlling the other switches to be turned off.

The first switch, the second switch, the third switch, the fourth switch, the fifth switch, the seventh switch, the eleventh switch, the twelfth switch, the thirteenth switch and the fourteenth switch are all turned on and off alternately with the first duty cycle D, and the sixth switch and the eighth switch are turned on and off alternately with the second duty ratio (1-D) complementary to the duty ratio D so that the ratio between the voltage at the input terminal and the voltage at the output terminal is 2N:D, and N is an even number greater or equal to 4.

In an optional manner, the controller is further configured to do the following:

In the first operating state of an operating cycle, control the first switch, the fourth switch, the sixth switch, the seventh switch, the ninth switch, the eleventh switch, the fourteenth switch to be turned on, and controls the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the fifth switch, the eighth switch, the tenth switch, the twelfth switch, the thirteenth switch to be turned on, and controls the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, the seventh switch, the ninth switch, the tenth switch, the eleventh switch, the twelfth switch, the thirteenth switch and the fourteenth switch are all turned on and off alternately with the first duty cycle D. The sixth switch and the eighth switch are turned on and off alternately with a second duty cycle (1-D) complementary to the first duty cycle D so that the ratio between the voltage at the input terminal and the voltage at the output terminal is 2N:D, and N is an odd number greater than or equal to 5.

In an optional manner, the first energy storage branch further includes an eleventh capacitor, a fifteenth switch, a sixteenth switch, a seventeenth switch, and an eighteenth switch.

The third terminal of the fifteenth switch is connected to the input terminal. The second terminal of the fifteenth switch is connected to the first terminal of the eleventh capacitor and the third terminal of the sixteenth switch connected. The second terminal of the sixteenth switch is connected to the first terminal of the fourth capacitor. The second terminal of the eleventh capacitor is connected to the second terminal of the seventeenth switch and the third terminal of the eighteenth switch. The second terminal of the eighteenth switch is grounded. The third terminal of the seventeenth switch is connected to the first terminal of the third capacitor.

The controller is connected to the first terminal of the fifteenth switch, the first terminal of the sixteenth switch, the first terminal of the seventeenth switch, and the first terminal of the eighteenth switch.

In an optional manner, the controller is further configured to do the following:

In a first operating state of an operating cycle, controlling the first switch, the fourth switch, the fifth switch, the eighth switch, the sixteenth switch and the eighteenth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the sixth switch, the seventh switch, the fifteenth switch and the seventeenth switch to be turned on and controlling the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, the seventh switch, the fifteenth switch, the sixteenth switch, the seventeenth switch and the eighteenth switch are all turned on and off alternately with the first duty cycle D. The sixth switch and the eighth switch are turned on and off alternately with a second duty cycle (1-D) complementary to the duty cycle D so that the ratio between the voltage at the input terminal and the voltage at the output terminal is 2N:D, and N is an even number greater or equal to 2.

In an optional manner, the controller is further configured to do the following:

In a first operating state of an operating cycle, controlling the first switch, the fourth switch, the sixth switch, the seventh switch, the ninth switch, the sixteenth switch, the eighteenth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the fifth switch, the eighth switch, the tenth switch, the fifteenth switch and the seventeenth switch to be turned on, and controlling the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, the seventh switch, the ninth switch, the tenth switch, the fifteenth switch, the sixteenth switch, the seventeenth switch and the eighteenth switch are all turned on and off alternately with the first duty cycle D. The sixth switch and the eighth switch are alternately turned on and off with a second duty cycle (1-D) complementary to the first duty cycle D so that the ratio between the voltage at the input terminal and the voltage at the output terminal is 2N:D, and N is an odd number greater than or equal to 3.

In an optional manner, the first energy storage branch further includes an eleventh capacitor, a fifteenth switch, a sixteenth switch, a seventeenth switch, and an eighteenth switch.

The third terminal of the fifteenth switch is connected to the input terminal, the second terminal of the fifteenth switch is connected to the first terminal of the eleventh capacitor and the third terminal of the sixteenth switch. The second terminal of the sixteenth switch is connected to the first terminal of the fourth capacitor. The second terminal of the eleventh capacitor is connected to the second terminal of the seventeenth switch and the third terminal of the eighteenth switch. The second terminal of the eighteenth switch is grounded. The third terminal of the seventeenth switch is connected to the first terminal of the third capacitor.

The controller is connected to the first terminal of the fifteenth switch, the first terminal of the sixteenth switch, the first terminal of the seventeenth switch, and the first terminal of the eighteenth switch.

In an optional manner, the controller is further configured to do the following:

In a first operating state of an operating cycle, controlling the first switch, the fourth switch, the fifth switch, the eighth switch, the eleventh switch, and the fourteenth switch, the sixteenth switch and the eighteenth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the sixth switch, the seventh switch, the twelfth switch, the thirteenth switch, the fifteenth switch and the seventeenth switch to be turned on, and controlling the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, the seventh switch, the eleventh switch, the twelfth switch, the thirteenth switch, the fourteenth switch, the fifteenth switch, the sixteenth switch, the seventeenth switch and the eighteenth switch are all alternately turned on and off based on a first duty cycle D. The sixth switch and the eighth switch are alternately turned on and off with a second duty cycle (1-D) complementary to the first duty cycle D so that the ratio between the voltage at the input terminal and the voltage at the output terminal is 2N:D, and N is an even number greater than or equal to 4.

In an optional manner, the controller is further configured to do the following:

In a first operating state of an operating cycle, controlling the first switch, the fourth switch, the sixth switch, the seventh switch, the ninth switch, the eleventh switch, the fourteenth switch, the sixteenth switch and the eighteenth switch to be turned on, and controlling the other switches to be turned off.

In a second operating state of the operating cycle, controlling the sixth switch and the eighth switch to be turned on, and controlling the other switches to be turned off.

In a third operating state of the operating cycle, controlling the second switch, the third switch, the fifth switch, the eighth switch, the tenth switch, the twelfth switch, the thirteenth switch, the fifteenth switch and the seventeenth switch to be turned on, and controlling the other switches to be turned off.

In a fourth operating state of the operating cycle, controlling the sixth switch and the eighth switch to be turned on, and controlling the other switches to be turned off.

The first switch, the second switch, the third switch, the fourth switch, the fifth switch, the seventh switch, the ninth switch, the tenth switch, the eleventh switch, the twelfth switch, the thirteenth switch, the fourteenth switch, the fifteenth switch, the sixteenth switch, the seventeenth switch and the eighteenth switches are all alternately turned on and off with a first duty cycle D. The sixth switch and the eighth switch are turned on and off alternately at a second duty cycle (1-D) complementary to the first duty cycle D so that the ratio between the voltage at the input terminal and the voltage at the output terminal is 2N:D, and N is an odd number greater than or equal to 5.

In an optional manner, the first duty cycle is less than or equal to 50%.

In a second aspect, the present application provides an electronic device including the above-mentioned voltage conversion circuit.

The beneficial effect of the present application is that the voltage conversion circuit provided by the present application includes an input terminal, an output terminal, a first energy storage branch, a second energy storage branch, a third energy storage branch and a controller. The input terminal is used to connect with the input power supply. The output terminal is used to connect to the load. The first terminal of the first energy storage branch is grounded. The second terminal of the first energy storage branch is connected to the input terminal. The third terminal of the branch of the first energy storage branch is connected to the first terminal of the second energy storage branch. The fourth terminal of the first energy storage branch is connected to the first terminal of the third energy storage branch. The second terminal of the second energy storage branch is connected to the third terminal of the third energy storage branch. The third terminal of the second energy storage branch is connected to the second terminal of the third energy storage branch. The fourth terminal of the second energy storage branch and the fourth terminals of the third energy storage branches are all connected with the output terminal. The first energy storage branch includes a first capacitor, a second capacitor, a first switch, a second switch, a third switch and a fourth switch. The first terminal of the first capacitor is grounded. The second terminal of the first capacitor is connected to the input terminal and the third terminal of the first switch. The second terminal of the first switch is connected to the third terminal of the second switch and the first terminal of the second capacitor. The second terminal of the switch is connected to the first terminal of the second energy storage branch. The second terminal of the second capacitor is connected to the third terminal of the third switch and the second terminal of the fourth switch. The second terminal of the third switch is grounded. The third terminal of the fourth switch is connected to the first terminal of the third energy storage branch. The first terminal of the first capacitor is the first terminal of the first energy storage branch terminal. The second terminal of the first capacitor is the second terminal of the first energy storage branch. The second terminal of the second switch is the third terminal of the first energy storage branch. The third terminal of the fourth switch is the fourth terminal of the first energy storage branch. The controller is connected with the first terminals of the switches of the first energy storage branch, the second energy storage branch and the third energy storage branch. The controller is used to control the on and off of the switches so that the ratio between the voltage at the input terminal and the voltage at the output terminal is 2N:D, where N is an integer greater than or equal to 2, and D is the first duty cycle of the signal output by the controller to control the first switch, the second switch, the third switch and the fourth switch. Therefore, the above process realizes the control of the output voltage by introducing duty cycle control on top of the fixed ratio voltage step-down. Then, the voltage rating of each power switch in the circuit can be effectively reduced, and at the same time, the maximum current that needs to flow through each power switch can be reduced. Therefore, higher switching utilization efficiency can be achieved, which is beneficial to achieving lower power loss and higher voltage conversion efficiency.

BRIEF DESCRIPTION OF THE DRAWINGS

One or more embodiments are exemplified by the pictures in the corresponding drawings, and these exemplifications do not constitute limitations of the embodiments, and elements with the same reference numerals in the drawings are denoted as similar elements, unless otherwise stated, the figures in the accompanying drawings do not constitute a scale limitation.

DETAILED DESCRIPTION OF ILLUSTRATIVE EMBODIMENTS

In order to make the purposes, technical solutions and advantages of the embodiments of the present application clearer, the technical solutions in the embodiments of the present application will be described clearly and completely below with reference to the drawings in the embodiments of the present application. Obviously, the described embodiments is a part of the embodiments of the present application, but not all of the embodiments. Based on the embodiments in the present application, all other embodiments obtained by those of ordinary skill in the art without creative efforts shall fall within the protection scope of the present application.

Figure 1:
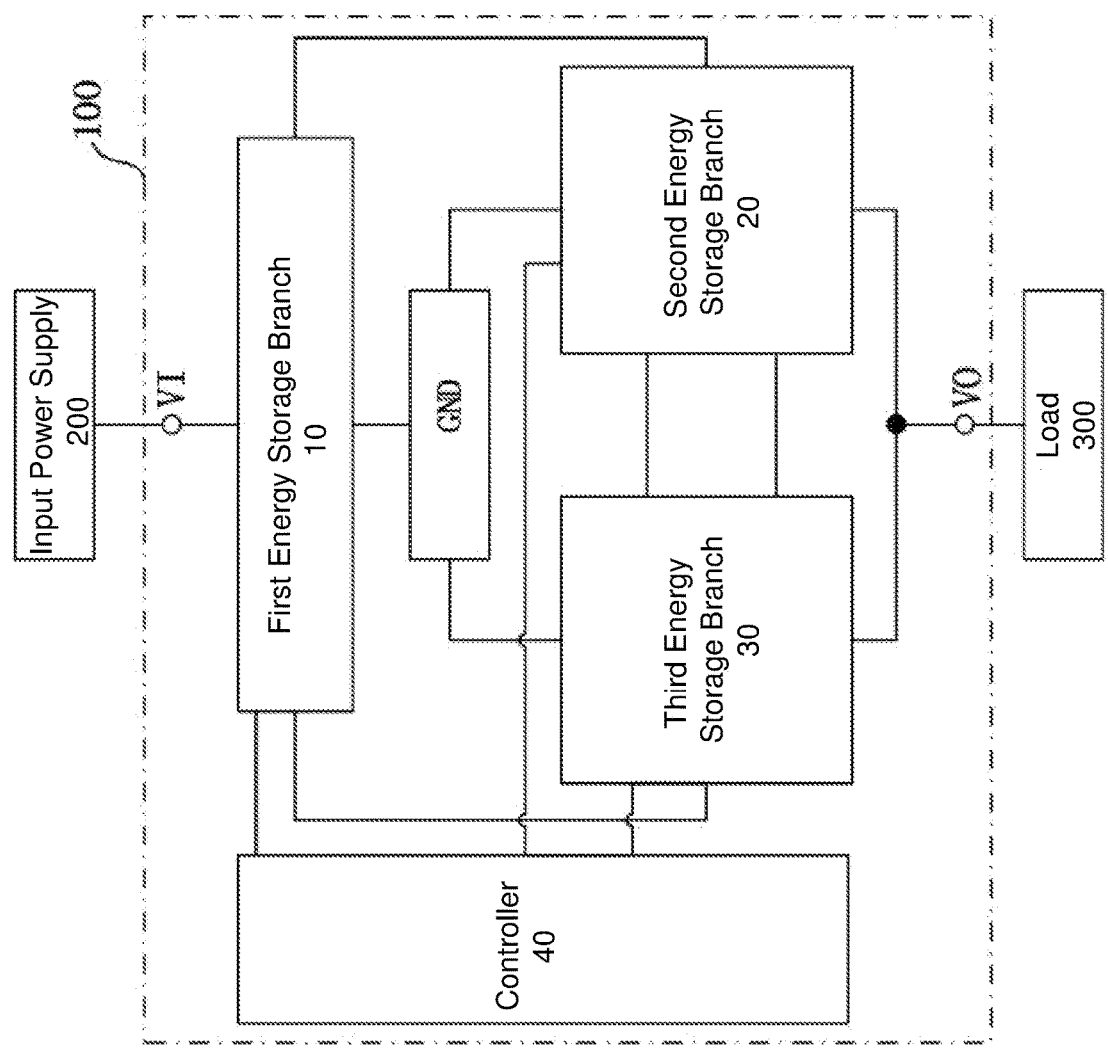
FIG. 1 is a schematic structural diagram of a voltage conversion circuit provided by an embodiment of the present application.

Please refer to FIG. 1, which is a schematic structural diagram of a voltage conversion circuit 100 provided by an embodiment of the present application. As shown in FIG. 1, the voltage conversion circuit 100 includes an input terminal VI, an output terminal VO, a first energy storage branch 10, a second energy storage branch 20, a third energy storage branch 30 and a controller 40.

The input terminal VI is connected to the input power supply. The output terminal VO is connected to the load 300. The first terminal of the first energy storage branch 10 is grounded to GND, and the second terminal of the first energy storage branch 10 is connected to the input terminal VI. The third terminal of the first energy storage branch 10 is connected to the first terminal of the second energy storage branch 20. The fourth terminal of the first energy storage branch 10 is connected to the first terminal of the third energy storage branch 30. The second terminal of the second energy storage branch 20 is connected to the third terminal of the third energy storage branch 30. The third terminal of the second energy storage branch 20 is connected to the second terminal of the third energy storage branch 30. The fourth terminal of the second energy storage branch 20 and the fourth terminal of the third energy storage branch 30 are both connected to the output terminal VO. The fifth terminal of the second energy storage branch 20 and the fifth terminals of the third energy storage branches 30 are all grounded to GND. The controller 40 is connected to the first terminals of the switches of the first energy storage branch 10, the second energy storage branch 20 and the third energy storage branch 30.

Figure 2:
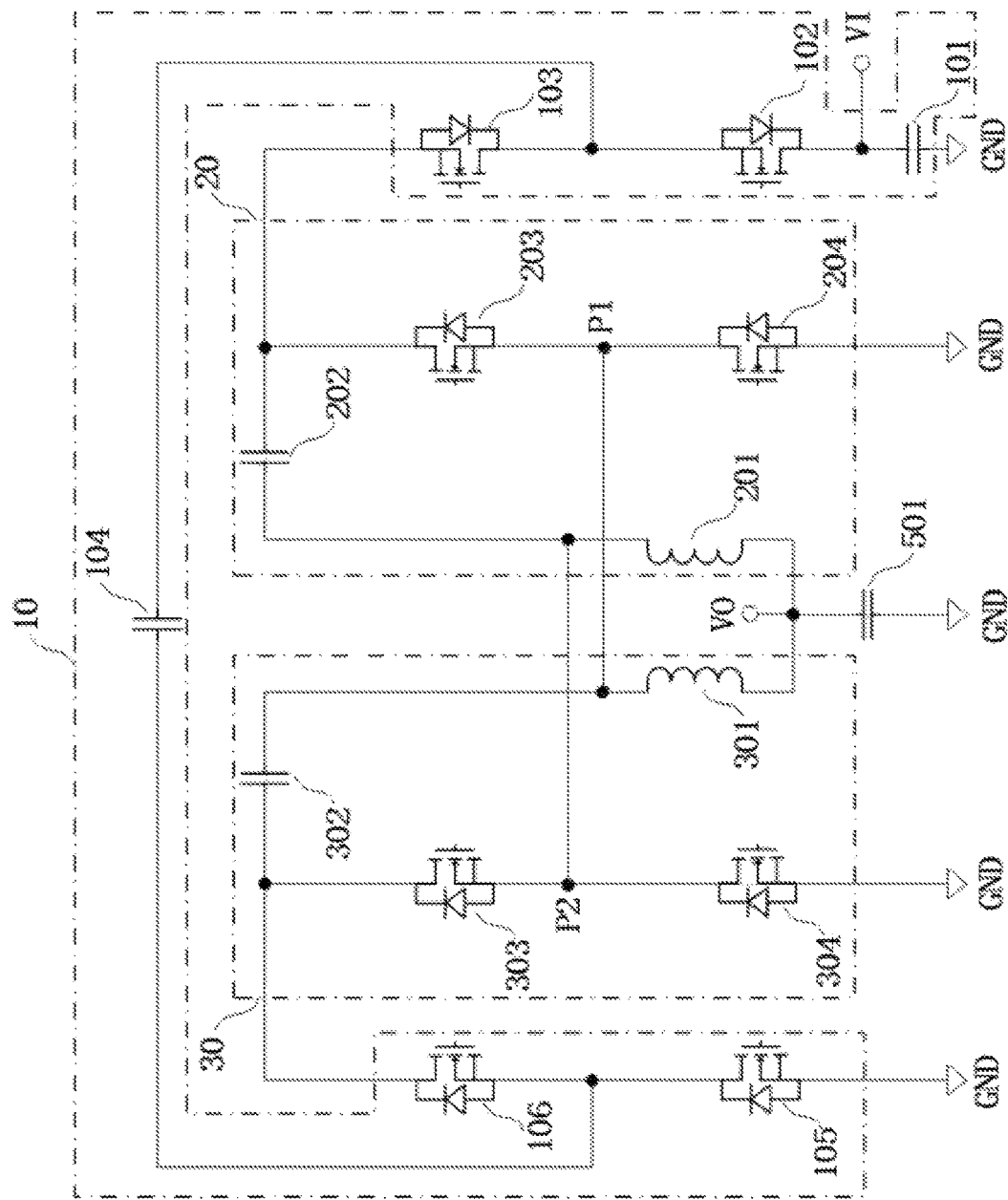
FIG. 2 is a schematic diagram of a circuit structure of a voltage conversion circuit provided by an embodiment of the present application.

Referring to FIG. 1 and FIG. 2 together, the first energy storage branch 10 includes a first capacitor 101, a second capacitor 104, a first switch 102, a second switch 103, a third switch 105 and a fourth switch 106. The first terminal of the first capacitor 101 is grounded to GND. The second terminal of the first capacitor 101 is connected to the input terminal VI and the third terminal of the first switch 102. The second terminal of the first switch 102 is connected to the third terminal of the second switch 103 and the first terminal of the second capacitor 104. The second terminal of the second switch 103 is connected to the first terminal of the second energy storage branch 20. The second terminal of the second capacitor 104 is connected to the third terminal of the third switch 105 and the second terminal of the fourth switch 106. The second terminal of the third switch 105 is grounded to GND. The third terminal of the fourth switch 106 is connected to the first terminal of the third energy storage branch 30. The first terminal of the first capacitor 101 is the first terminal of the first energy storage branch 10. The second terminal of the first capacitor 101 is the second terminal of the first energy storage branch 10. The second terminal of the second switch 103 is the third terminal of the first energy storage branch 10. The third terminal of the fourth switch 106 is the fourth terminal of the first energy storage branch 10.

Specifically, the controller 40 is used to control the turn-on and turn-off of each switch, so that the ratio of the voltage at the input terminal VI to the voltage at the output terminal VO is 2N:D, where N is an integer equal or greater than 2, and D is the first duty cycle of the signal output by the controller 40 to control the first switch 102, the second switch 103, the third switch 105 and the fourth switch 106.

The first duty cycle is the duty cycle of the signals used to control each switch (including the first switch 102, the second switch 103, the third switch 105 and the fourth switch 106) in the first energy storage branch 10.

In this embodiment, the voltage conversion circuit 100 further applies the first duty cycle D to control the output voltage on top of a fixed step-down ratio (e.g., 2N:1), so as to effectively reduce the voltage that each power switch needs to withstand. Each power switch includes switches in the first energy storage branch 10, the second energy storage branch 20 and the third energy storage branch 30, such as the first switch 102, the second switch 103, the third switch 105 and the fourth switch 106. At the same time, the maximum current that needs to carry by each power switch can also be reduced. Thus, higher switching utilization efficiency is achieved, which is beneficial to achieve lower power loss and higher voltage conversion efficiency.

It should be noted that, in the embodiments of the present application, it is assumed that each switch is a MOS transistor as an example. While in other embodiments, the switches may also be any controllable switches, such as insulated gate bipolar transistor (IGBT) devices, integrated gate commutated thyristor (IGCT) devices, turn-off thyristor (GTO) devices, silicon Controlled Rectifier (SCR) devices, Junction Gate Field Effect Transistor (JFET) devices, MOS Controlled Thyristor (MCT) devices, Gallium Nitride (GaN) based power devices, Silicon Carbide (SiC)-based power devices, etc. The comparison of the embodiments of the present application is not limited.

Meanwhile, taking the first switch 102 as an example, when the first switch 102 selects an N-type MOS transistor, the gate of the MOS transistor is the first terminal of the first switch 102, and the source of the MOS transistor is the second terminal of the first switch 102. The drain of the MOS transistor is the third terminal of the first switch 102. When the first terminal of the first switch 102 is controlled to be at a high level, it means that the voltage applied between the gate and source terminals of the MOS transistor is at a high level, thereby turning on the MOS transistor. The application of other switches is the same as that of the first switch 102, which are within the scope of easy understanding by those skilled in the art and will not be repeated here.

In one embodiment, referring to FIG. 2, when N is an even number equal or greater than 2, the second energy storage branch 20 includes a third capacitor 202, a first inductor 201, a fifth switch 203 and a sixth switch 204. The third energy storage branch 30 include a fourth capacitor 302, a second inductor 301, a seventh switch 303 and an eighth switch 304.

The first terminal of the third capacitor 202 is connected to the third terminal of the first energy storage branch 10 and the third terminal of the fifth switch 203. The second terminal of the fifth switch 203 is connected to the third terminal of the sixth switch 204, the second terminal of the fourth capacitor 302 and the first terminal of the second inductor 301. The second terminal of the sixth switch 204 is grounded to GND. The second terminal of the third capacitor 202 is connected to the first terminal of the first inductor 201, the second terminal of the seventh switch 303 and the third terminal of the eighth switch 304. The second terminal of the first inductor 201 is connected to the second terminal of the second inductor 301 and the output terminal VO. The first terminal of the fourth capacitor 302 is connected to the fourth terminal of the first energy storage branch 10 and the third terminal of the seventh switch 303. The second terminal of the eighth switch 304 is grounded to GND.

The first terminal of the third capacitor 202 is the first terminal of the second energy storage branch 20. The second terminal of the third capacitor 202 is the third terminal of the second energy storage branch 20. The second terminal of the fifth switch 203 is the second terminal of the second energy storage branch 20. The second terminal of the first inductor 201 is the fourth terminal of the second energy storage branch 20. The first terminal of the fourth capacitor 302 is the first terminal of the third energy storage branch 30. The second terminal of the fourth capacitor 302 is the third terminal of the third energy storage branch 30. The second terminal of the seventh switch 303 is the second terminal of the third energy storage branch 30. The second terminal of the two inductors 301 is the fourth terminal of the third energy storage branch 30.

In one embodiment, the voltage conversion circuit 100 further includes a first filter capacitor 501. The first terminal of the first filter capacitor 501 is connected to the output terminal VO. The second terminal of the first filter capacitor 501 is grounded to GND.

Figure 3:
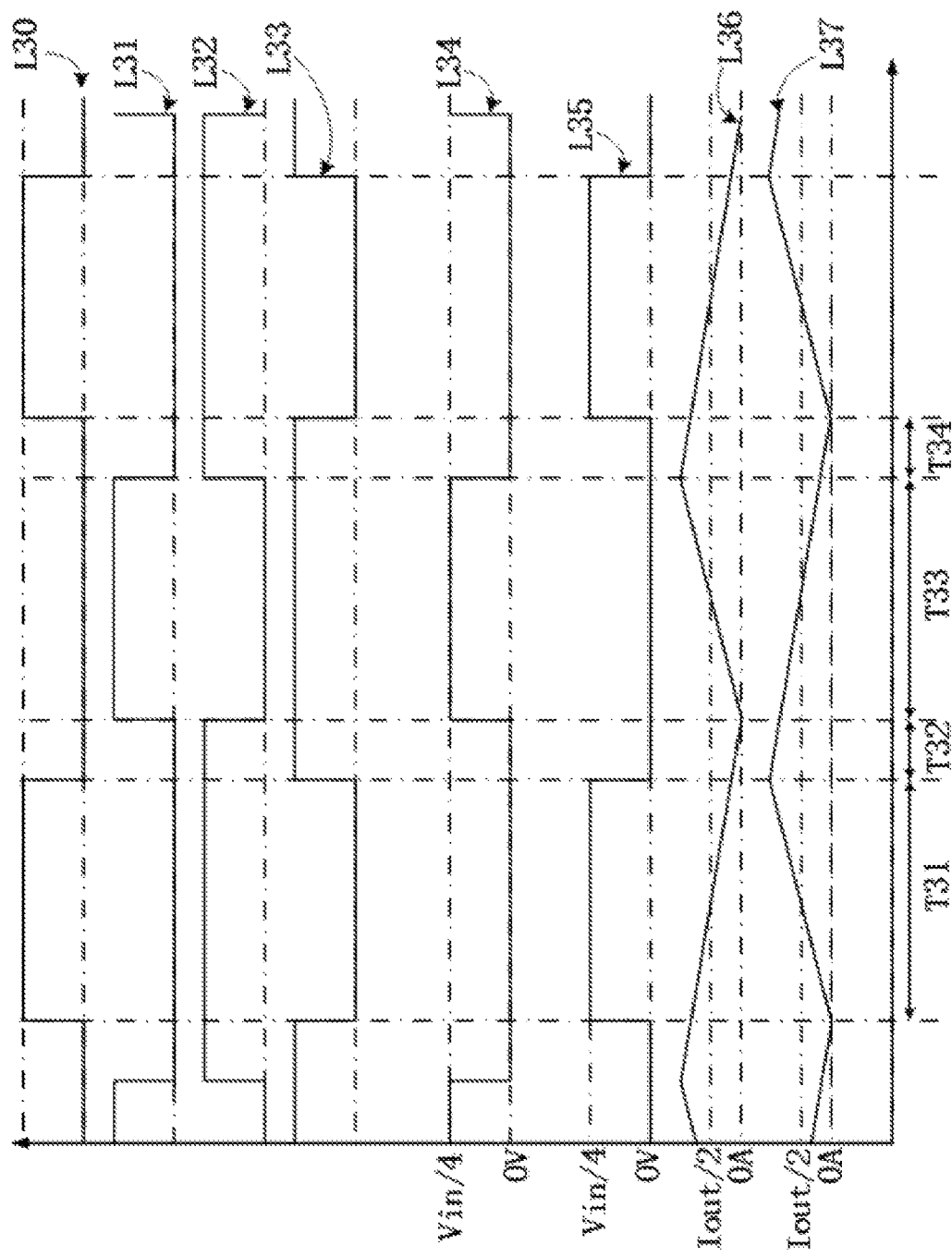
FIG. 3 is a schematic diagram of each signal in the voltage conversion circuit shown in FIG. 2 provided by an embodiment of the present application.

The operating principle of the circuit structure shown in FIG. 2 will be described below with reference to FIG. 2 and FIG. 3. FIG. 3 shows a schematic diagram of each signal in the circuit structure described in FIG. 2. In this embodiment, the curve L30 is a waveform of the control signals of the first switch 102, the fourth switch 106 and the fifth switch 203. The curve L31 is a waveform of the control signals of the second switch 103, the third switch 105 and the seventh switch 303. Curve L32 is a waveform of the control signal of the eighth switch 304. Curve L33 is a waveform of the control signal of the sixth switch 204. Curve L34 is a waveform of the voltage on the second connection point P2. L35 is the waveform of the voltage on the first connection point P1. Curve L36 is the waveform of the current flowing through the first inductor 201. Curve L37 is the waveform of the current flowing through the second inductor 301. The sum of the time interval T31, the time interval T32, the time interval T33 and the time interval T34 is an operating cycle. The operating state in the time interval T31 corresponds to the first operating state of an operating cycle, and the operating state in the time interval T32 corresponds to the second operating state of an operating cycle. The operating state within the time interval T33 corresponds to the third operating state of an operating cycle, and the operating state within the time interval T34 corresponds to the fourth operating state of the operating cycle. Vin is the voltage of the input power input at the input terminal VI. Tout is the output current at the output terminal VO. The first connection point P1 is the connection point between the second terminal of the fifth switch 203 and the third terminal of the sixth switch 204. The second connection point P2 is the connection point between the second terminal of the seventh switch 303 and the third terminal of the eighth switch 304.

It can be understood that the control signal in any embodiment of the present application is output by the controller 40. Meanwhile, in the embodiments of the present application, the high level of the curve in the drawings indicates that the corresponding switch is turned on, and the low level is corresponding to the switch to be turned off. For example, the curve L30 is a high-level signal during the time interval T31, and at this time, the first switch 102, the fourth switch 106 and the fifth switch 203 are turned on.

Specifically, in this embodiment, the controller 40 is further configured to: control the first switch 102, the fourth switch 106, the fifth switch 203, and the eighth switch 304 to be turned on in the first operating state of an operating cycle, and control other switches to be turned off; in the second operating state of an operating cycle, control the sixth switch 204 and the eighth switch 304 to be turned on, and control the other switches to be turned off; in the third operating state of an operating cycle, control the second switch 103, the third switch 105, the sixth switch 204 and the seventh switch 303 to be turned on, and control the other switches to be turned off; in the fourth operating state of an operating cycle, control the sixth switch 204, the seventh switch, the eighth switches 304 to be turned on and control other switches to be turned off.

The first switch 102, the second switch 103, the third switch 105, the fourth switch 106, the fifth switch 203, and the seventh switch 303 are alternately turned on and off with the first duty cycle D. The sixth switch 204 and the eighth switch 304 are alternately turned on and off with a duty ratio (1-D) complementary to the first duty cycle D, so that the ratio of the voltage at the input terminal VI to the voltage at the output terminal VO is 2N:D, and N is an even number equal or greater than 2. The ratio of the voltage at the input terminal VI to the voltage at the output terminal VO in the circuit shown in FIG. 2 is 4:D. That is, the voltage on the output terminal VO is D/4 of the voltage at the input terminal VI.

The first switch 102, the fourth switch 106, and the fifth switch 203 have the same conduction phase and duration, and the conduction time in a steady state is DxTs, where Ts represents duration of one operating cycle. The second switch 103, the third switch 105, and the seventh switch 303 have the same conduction phase and duration, and the conduction time in a steady state is DxTs. The conduction phase of the first switch 102 is opposite to the conduction phase of the second switch 103. The control signal of the sixth switch 204 is complementary to the control signal of the first switch 102. Similarly, the control signal of the eighth switch 304 is complementary to the control signal of the second switch 103. The duty cycles of the sixth switch 204 and the eighth switch 304 are both the second duty cycle (1−D) that is complementary to the first duty cycle D.

A higher voltage conversion ratio can be obtained by extending the voltage conversion circuit 100 shown in FIG. 2 so that the ratio between the voltage at the input terminal VI and the voltage at the output terminal VO is 2N:D. N is an even number equal or greater than 2. The specific circuit expansion method will be described in detail in the following paragraphs.

As shown in FIG. 3, for the voltage conversion circuit 100, each operating cycle includes four operating states. In the first operating state of an operating cycle, that is, within the time interval T31, the first switch 102, the fourth switch 106, the fifth switch 203, and the eighth switch 304 are turned on, and the other switches are kept turned off. In this case, the second inductor 301 is in a charged state, and the voltage at the second terminal of the second inductor 301 is denoted as VOUT. Then, the voltage at the first terminal of the second inductor 301 is VP1. VP1 is equal to VOUT/D, and equal to VX. The current flowing through the second inductor 301 comes from the charging of the second capacitor 104 and the fourth capacitor 302 through the first switch 102 and the fourth switch 106 by the input power at the input terminal VI and the discharging of the second inductor 301 by the third capacitor 202 through the fifth switch 203. The first inductor 201 is in a discharging state. The first terminal of the first inductor 201 is grounded to GND through the eighth switch 304, and the voltage at the second terminal of the first inductor 201 is also VOUT.

In the third operating state of an operating cycle, that is, the time interval T33, the second switch 103, the third switch 105, the sixth switch 204 and the seventh switch 303 are turned on, and the other switches are kept turned off. In this case, the first inductor 201 is in a charging state, the voltage at the second terminal of the first inductor 201 is VOUT, and the voltage at the first terminal of the first inductor 201 is also VP2. VP2 is equal to VOUT/D, and equal to VX. The current of the first inductor 201 comes from the discharge of the second capacitor 104 through the second switch 103 and the third switch 105 to the third capacitor 202 and the discharge of the first inductor 201 by the fourth capacitor 302 through the sixth switch 204 and the seventh switch 303. The second inductor 301 is in a discharging state. The first terminal of the second inductor 301 is grounded to GND through the sixth switch 204, and the voltage at the second terminal of the second inductor 301 is VOUT.

The second operating state of an operating cycle is consistent with the fourth operating state. That is, in the time interval T32 or the time interval T34, the sixth switch 204 and the eighth switch 304 are turned on, and the other switches are turned off. In this case, both the first inductor 201 and the second inductor 301 are in a discharging state, and the first terminal of the second inductor 301 and the first terminal of the first inductor 201 are grounded to GND through the sixth switch 204 and the eighth switch 304. The voltage at the second terminal of the second inductor 301 and the voltage at the second terminal of the first inductor 201 are both VOUT.

In sum, in one operating cycle, the first inductor 201 is charged in the third operating state, and discharged in the first operating state, the second operating state and the fourth operating state. The second inductor 301 is charged in the first operating state and discharged in the second operating state, the third operating state and the fourth operating state.

Then, in the first operating state:

$$VX = VC202 \quad (1)$$

$$VX + VC302 + VC104 = Vin \quad (2)$$

VC104 is the voltage across the second capacitor 104. VC202 is the voltage across the third capacitor 202, and VC302 is the voltage across the fourth capacitor 302.

In the third operating state:

$$VX = VC302 \quad (3)$$

$$VX + VC202 = VC104 \quad (4)$$

Combining formulas (1) (2) (3) (4), the following equations can be obtained:

$$VX = VC202 = VC302 = Vin/4$$

$$VC104 = 2 \times VX = 2 \times Vin/4$$

According to the description of the above operating process, combined with VX is equal to VOUT/D, the output voltage of the voltage conversion circuit 100 can be obtained. That is, the voltage VOUT on the output terminal VO is:

$$VOUT = D \times VX = Vin \times D/4 \quad (5)$$

It can be known from Equation (5) that the output voltage of the voltage conversion circuit 100 can be adjusted by controlling the duty cycle D.

In this embodiment, it can be known from Equations (1), (2), (3) and (4) that the voltage conversion circuit 100 provided by the embodiment of the present application satisfies the ratio between the voltage at the input terminal VI and the voltage at the output terminal VO to be 4:D. Under the premise, the maximum voltage across the two terminals of the second capacitor 104 is half of the voltage at the input terminal VI, namely Vin/2, and the maximum voltage across the third capacitor 202 and the fourth capacitor 302 is ¼ of the voltage at the input terminal VI, that is, Vin/4, which can effectively reduce the voltage that each power switch in the circuit needs to withstand, so as to achieve higher switching efficiency and lower power losses and higher voltage conversion efficiency. Moreover, since the voltage drop that needs to be endured on each flying capacitor is low, the effective capacitance of each flying capacitor is higher, which is beneficial to further improve the voltage conversion efficiency.

Figure 4:
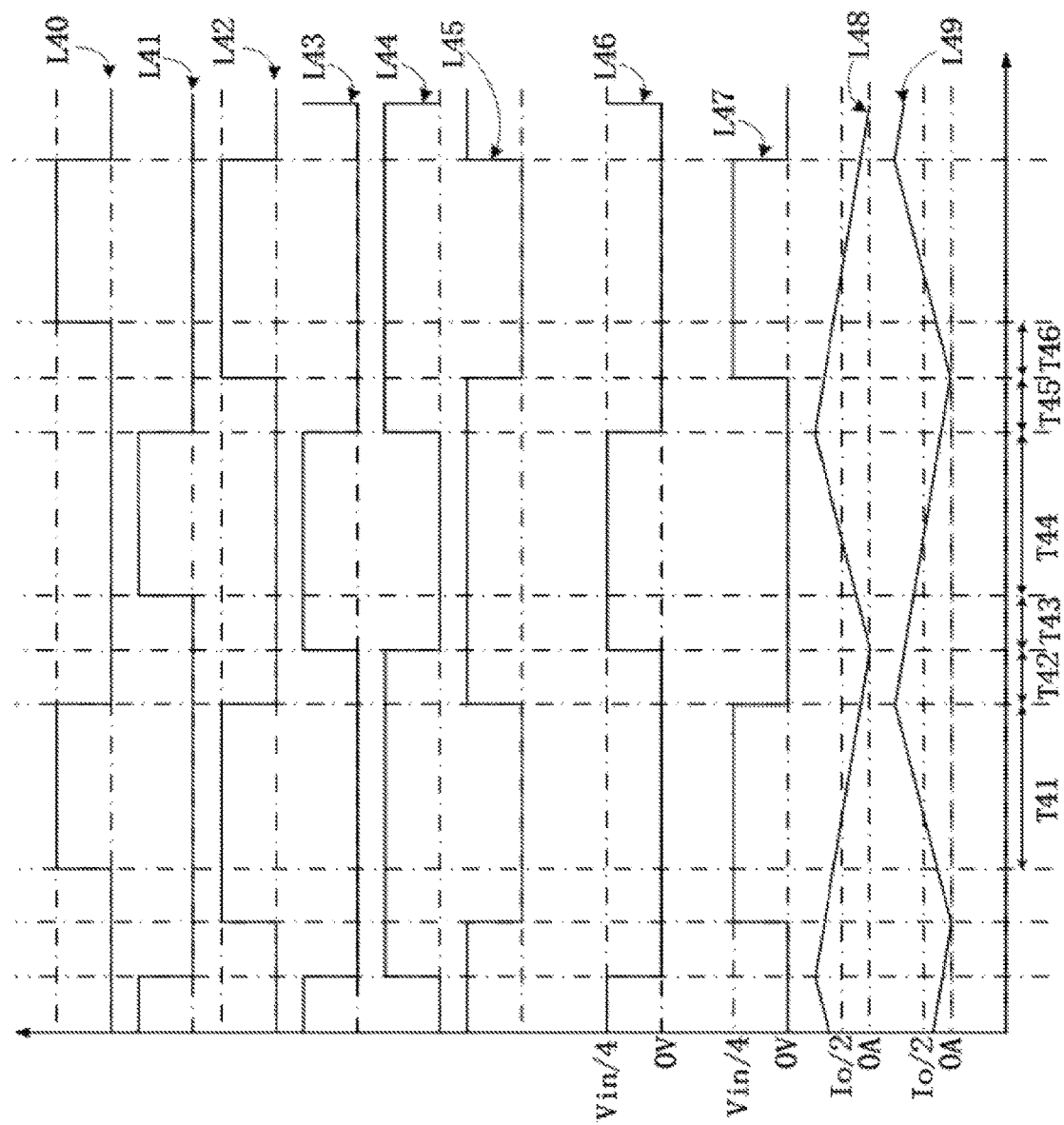
FIG. 4 is a schematic diagram of each signal in the voltage conversion circuit shown in FIG. 2 provided by another embodiment of the present application.

In another embodiment, for the circuit structure shown in FIG. 2, the embodiment of the present application further provides another control scheme. Referring to FIG. 4, FIG. 4 shows a waveform of each control signal in another control scheme of the circuit structure described in FIG. 2.

As shown in FIG. 4, the curve L40 is a waveform of the control signal of the fifth switch 203. The curve L41 is a waveform of the control signal of the seventh switch 303. The curve L42 is a waveform of the control signal of the first switch 102 and the fourth switch 106. The curve L43 is a waveform of the control signal of the second switch 103 and the third switch 105. The curve L44 is a waveform of the control signal of the eighth switch 304. The curve L45 is the waveform of the control signal of the sixth switch 204. The waveform of the control signal curve L46 is a waveform of the voltage at the second connection point P2. The curve L47 is a waveform of the voltage at the first connection point P1. The curve L48 is a waveform of the current flowing through the first inductor 201. The curve L49 is a waveform of the current flowing through the second inductor 301. The sum of time interval T41, time interval T42, time interval T43, time interval T44, time interval T45 and time interval T46 is one operating cycle. The operating state in time interval T41 corresponds to the first operating state of an operating cycle. The operating state in time interval T42 corresponds to the second operating state of the operating cycle, and the operating state in time interval T43 corresponds to the third operating state of the operating cycle. The operating state within the time interval T44 corresponds to the fourth operating state of the operating cycle, and the operating state within the time interval T45 corresponds to the fifth operating state of the operating cycle. The operating state in the time interval T46 corresponds to the sixth operating state of the operating cycle. Vin is the voltage of the input power input at the input terminal VI. Tout is the current output at the output terminal VO.

Specifically, in this embodiment, the controller 40 is further configured to: control the first switch 102, the fourth switch 106, the fifth switch 203, and the eighth switch 304 to be turned on in the first operating state of an operating cycle, and control the other switches to be turned off; in the second operating state of the operating cycle, control the sixth switch 204 and the eighth switch 304 to be turned on, and control the other switches to be turned off; in the third operating cycle of the operating cycle, control the second switch 103, the third switch 105, and the sixth switch 204 to be turned on, and control the other switches to be turned off; in the fourth operating state of the operating cycle, control the second switch 103, the third switch 105, the sixth switch 204 and the seventh switch 303 to be turned on, and control the other switches to be turned off; in the fifth operating state of the operating cycle, control the sixth switch 204 and the eighth switch 304 to be turned on, and control the other switches to be turned off; in the sixth operating state of an operating cycle, control the first switch 102, the fourth switch 106, and the eighth switch 304 to be turned on, and control the other switches to be turned off.

The first switch 102, the second switch 103, the third switch 105, and the fourth switch 106 are alternately turned on and off with the first duty cycle D, and the sixth switch 204 and the eighth switch 304 are alternately turned on and off with a duty cycle (1-D) that is complementary to the first duty cycle D. The fifth switch 203 and the seventh switch 303 are alternately turned on and off with a third duty cycle, which is smaller than the first duty cycle D, such that the ratio between the voltage at the input terminal VI and the voltage at the output terminal VO is 2N:D. N is an even number equal or greater than 2. The ratio between the voltage at the input terminal VI to the voltage at the output terminal VO of the circuit shown in FIG. 2 is 4:D. That is, the voltage on the output terminal VO is D/4 of the voltage of the input terminal VI.

The conduction phase and duration of the first switch 102 and the fourth switch 106 are the same, and the conduction time in a steady state is DxTs, where Ts represents one operating cycle. The conduction phase and duration of the second switch 103 and the third switch 105 are the same, and the conduction time in the steady state is DxTs. The conduction phase of the first switch 102 is opposite to the conduction phase of the second switch 103. The control signal of the sixth switch 204 is complementary to the control signal of the first switch 102. Similarly, the control signal of the eighth switch 304 is complementary to the control signal of the second switch 103. The duty cycles of the sixth switch 204 and the eighth switch 304 are the second duty cycle (1-D) that is complementary to the first duty cycle D. The fifth switch 203 and the seventh switch 303 turn on at times that is a certain time delay from the turn-on of the first switch 102 and the second switch 103, and turn off together with the first switch 102 and the second switch 103. That is, turn on and off alternately with a third duty cycle that is smaller than the first duty cycle D.

The same control method can also be applied to applications where the voltage conversion circuit 100 shown in FIG. 2 is extended to reach a larger ratio between the voltage at the input terminal VI and the voltage at the output terminal VO. The extended ratio can be 2N:D. N is an even number equal or greater than 2. The specific circuit expansion method will be described in detail in the following paragraphs.

It can be understood that when the control signals of the circuit structure shown in FIG. 2 is configured to be as shown in FIG. 3, and when the capacitance of each flying capacitor is small or the operating frequency of the voltage conversion circuit 100 is low, the charge transfer losses between capacitors are often generated during the switching of capacitor connections. The specific principle of this charge sharing loss can be described with reference to FIG. 5, wherein FIG. 5 is an equivalent circuit schematic diagram of the voltage conversion circuit 100 in different operating states when the voltage conversion circuit 100 shown in FIG. 2 operates under the control scheme shown in FIG. 3.

Figure 5:
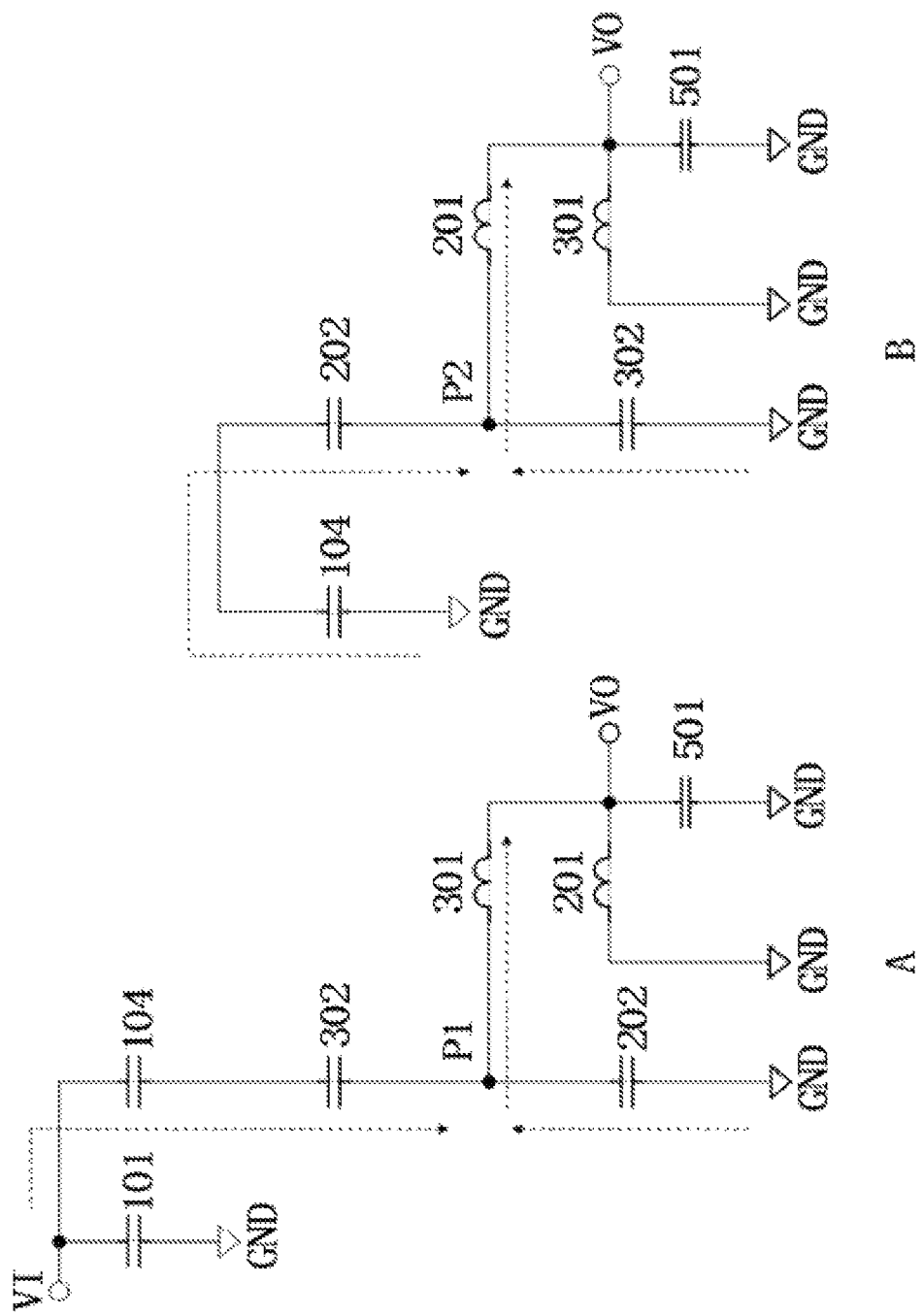
FIG. 5 is a schematic structural diagram of an equivalent circuit of the voltage conversion circuit shown in FIG. 2 according to an embodiment of the present application.

As shown in FIG. 5, in the first operating state of an operating cycle, since the first switch 102, the fourth switch 106, the fifth switch 203 and the eighth switch 304 are turned on, the equivalent circuit is shown in section A of FIG. 5. In this operating state, due to the existence of the first inductor 201 and the second inductor 301 at the output terminal VO, the voltages on the first connection point P1 and the second connection point P2 can be abruptly changed. It is assumed that the capacitances of all flying capacitors are equal, and the voltage across each capacitor is at its steady-state average voltage value at the moment when the first operating state begins, namely:

$$VC104 = Vin/2 \qquad (6)$$

$$VC302 = Vin/4 \qquad (7)$$

$$VC202 = Vin/4 \qquad (8)$$

At this time, the series path formed by the input voltage Vin at the input terminal VI, the second capacitor 104 and the fourth capacitor 302 is connected in parallel to the first capacitor 101 at the first connection point P1 and together provide current to the first inductor 201. Then, with the discharge of the third capacitor 202, at the end of the first operating state, assuming that the voltage on the first connection point P1 (e.g., the voltage on the third capacitor 202) decreases to (Vin/4−ΔV), wherein ΔV represents the voltage drop caused by the discharge of the third capacitor 202 to the output terminal Vo in the first operating state. Since the input voltage Vin remains unchanged, the currents flowing through the second capacitor 104 and the fourth capacitor 302 are equal. It can be obtained that the voltage across the second capacitor 104 is (Vin/2+ΔV/2), and the voltage across the fourth capacitor 302 becomes (Vin/4+ΔV/2).

Subsequently, the voltage conversion circuit 100 enters the second operating state in the operating cycle. At this time, each flying capacitor (including the second capacitor 104, the third capacitor 202 and the fourth capacitor 302) has no current, and each flying capacitor has no current. The voltage across both terminals is maintained.

Next, when the voltage conversion circuit 100 enters the third operating state in the operating cycle, the second switch 103, the third switch 105, the sixth switch 204 and the seventh switch 303 are turned on, and the other switches are turned off. The equivalent circuit is shown in part B of FIG. 5. At this time, the second capacitor 104 and the third capacitor 202 are connected in series and then connected in parallel with the fourth capacitor 302 at the second connection point P2. It can be concluded that there are two current paths in total at this time, one of which is the current path in which the second capacitor 104 and the third capacitor 202 are connected in series, and the voltage on this current path is VC104−VC202=(Vin/4+3ΔV/2). The other current path is a current path including the fourth capacitor 302, and the voltage of the third capacitor 202 on the current path is only (Vin/4+ΔV/2). Since the above-mentioned two current paths are connected to the same voltage node (e.g., the second connection point P2), and the combined voltages of the capacitors on the two current paths are unequal, at the same time, since the output is connected in series with the first inductor 201, the output current flowing from point P2 to VO cannot be abruptly changed. As a result, charges are rapidly transferred between the two current paths, resulting in current spikes and charge transfer losses. After the voltages of the two current paths are equalized, the two current paths will together charge the first inductor 201 and supply power to the output terminal VO. Moreover, with the decrease of the switching frequency of each power switch and the decrease of the capacitance of each flying capacitor, the voltage difference ΔV will increase significantly, and the charge transfer loss will increase significantly.

Furthermore, in order to solve the problems existing in the above-mentioned control method, the charge transfer loss between the flying capacitors can be reduced by delaying the time at which the current paths formed by a single capacitor (among the multitude of current paths) are connected to the circuit.

Figure 6:
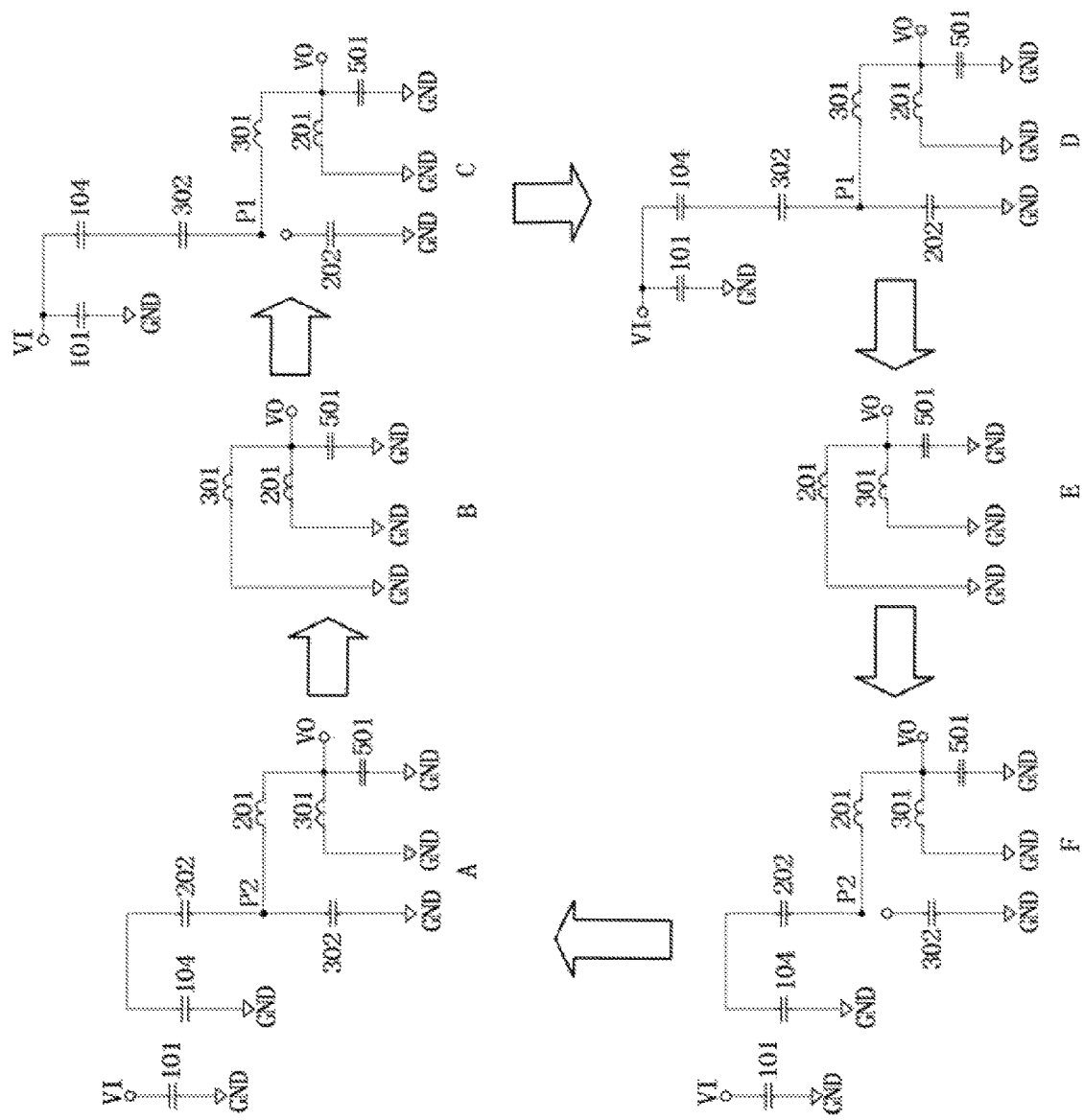
FIG. 6 is a schematic structural diagram of an equivalent circuit of the voltage conversion circuit shown in FIG. 2 according to another embodiment of the present application.

Specifically, as shown in FIG. 6, the voltage conversion circuit 100 shown in FIG. 2 can be controlled to operate beyond the control mode shown in FIG. 3 where the four operating states in one cycle can be extended to six operating states in one cycle. Part A of FIG. 6 is the equivalent circuit of the voltage conversion circuit 100 shown in FIG. 2 operating in the first operating state shown in FIG. 3. Part B of FIG. 6 is the equivalent circuit of the voltage conversion shown in FIG. 2 when the circuit 100 works in the second operating state shown in FIG. 3. Part D of FIG. 6 is the equivalent circuit when the voltage conversion circuit 100 shown in FIG. 2 is operating in the third operating state shown in FIG. 3. Part E of FIG. 6 is the equivalent circuit when the voltage conversion circuit 100 shown in FIG. 2 operates in the fourth operating state shown in FIG. 3. Then, an operating state is added between the fourth operating state and the first operating state. In this operating state, the equivalent circuit of the voltage conversion circuit 100 shown in FIG. 2 is shown as part F of FIG. 6. As shown in part F of FIG. 6, the current path composed of only the fourth capacitor 302 is not connected to the second connection point P2 (that is, corresponding to the fifth switch 203 being turned off). The current path formed by the second capacitor 104 and the third capacitor 202 in series charges the first inductor 201 and supplies power to the load 300. After a period of delay, when the voltage of the path formed by the second capacitor 104 and the third capacitor 202 connected in series (i.e., the voltage on the second connection point P2) is close to the voltage on the fourth capacitor 302, the fifth switch 203 turns on. The fifth switch 203 connects the fourth capacitor 302 to the second connection point P2 and enters the first operating state shown in part A of FIG. 6. At this time, since the voltages of the two-capacitor paths are equal, there is no rapid charge transfer between the flying capacitors, and the charge transfer loss is eliminated.

Similarly, an operating state can be added between the second operating state and the third operating state. In this operating state, the equivalent circuit of the voltage conversion circuit 100 shown in FIG. 2 is shown as part C of FIG. 6. Among them, the current path composed of only the third capacitor 202 is not connected to the first connection point P1 (i.e., the seventh switch 303 is turned off), and the input voltage Vin passes through the second capacitor 104 and the fourth capacitor 302. The current path composed of two capacitors in series charges the first inductor 201 and supplies power to the load 300. After a period of delay, when the voltage on the terminal of the path where the second capacitor 104 is connected in series with the fourth capacitor 302 is close to the voltage on the third capacitor 202, the seventh switch 303 is turned on to connect the third capacitor 202 to the first connection point P1 and enter the third operating state shown in part D in FIG. 6. At this time, since the voltages of the two-capacitor paths are equal, there is no rapid charge transfer between the flying capacitors, and the charge transfer loss is eliminated.

In sum, the control sequence corresponding to the scheme of delaying the connection of the current path with a single capacitor is shown in FIG. 4, wherein the first to the sixth operating states (i.e., the time interval T41 to T46) shown in FIG. 4 are sequentially corresponds to parts A to F shown in FIG. 6. It should be noted that any voltage conversion circuit extended based on the voltage conversion circuit 100 shown in FIG. 2 provided in the embodiments of the present application can be controlled by the control method of delaying connection of the current path of a single capacitor, because various extensions discussed later will only increase the current path formed by two flying capacitors in series, and the switches used to control the circuit connection of the single capacitor current path are always the fifth switch 203 and the seventh switch 303. Among them, the use of a control method similar to the delayed connection of the current path of the single capacitor shown in FIG. 4 can effectively reduce the charge transfer loss and make the voltage conversion efficiency higher.

Figure 7:
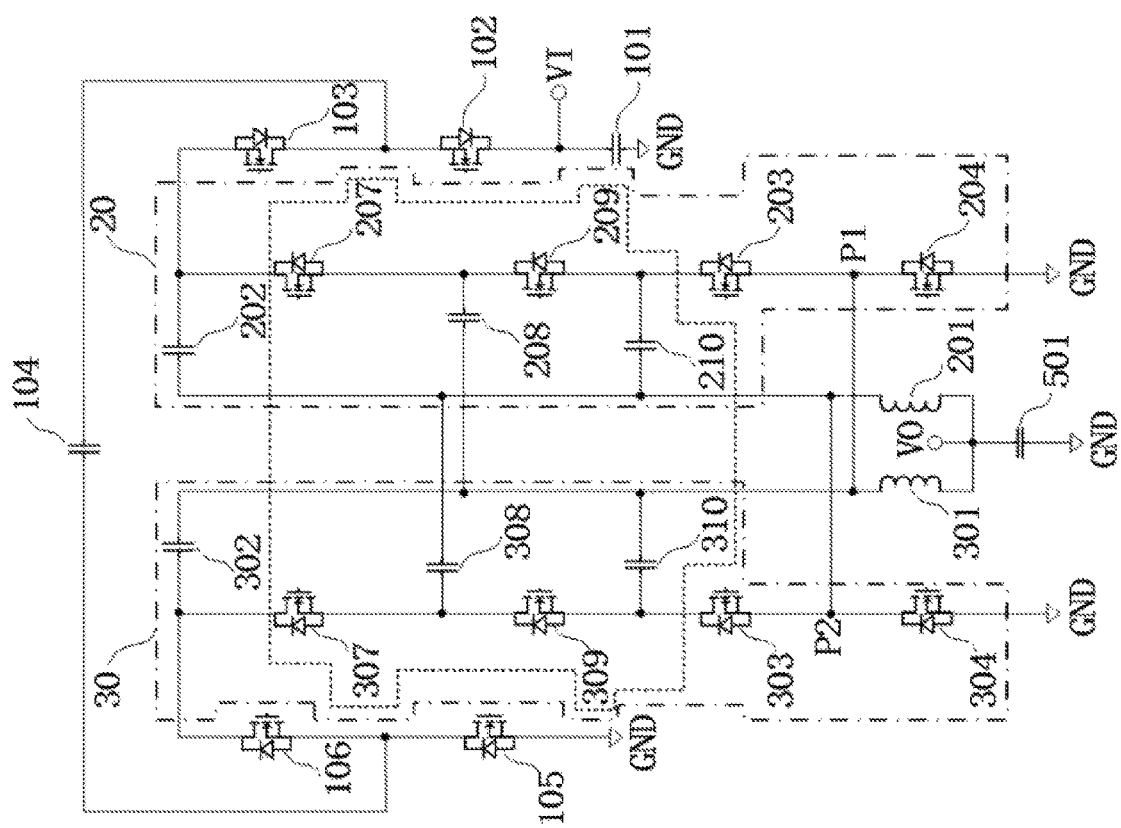
FIG. 7 is a schematic diagram of a circuit structure of a voltage conversion circuit provided by another embodiment of the present application.

In one embodiment, the voltage conversion circuit 100 shown in FIG. 2 can be extended to achieve a voltage conversion ratio of 2N:D. N is an even number greater than 2. As shown in FIG. 7, based on the circuit structure shown in FIG. 2, the second energy storage branch 20 further includes a seventh capacitor 208, an eighth capacitor 210, an eleventh switch 207 and a twelfth switch 209. The third energy storage branch 30 further includes a ninth capacitor 308, a tenth capacitor 310, a thirteenth switch 307 and a fourteenth switch 309.

The first terminal of the seventh capacitor 208 is connected to the second terminal of the eleventh switch 207 and the third terminal of the twelfth switch 209. The second terminal of the seventh capacitor 208 is connected to the first terminal of the second inductor 301. The third terminal of the eleventh switch 207 is connected to the first terminal of the third capacitor 202. The second terminal of the twelfth switch 209 is connected to the third terminal of the fifth switch 203 and the first terminal of the eighth capacitor 210. The second terminal of the eighth capacitor 210 is connected to the first terminal of the first inductor 201. The first terminal of the ninth capacitor 308 is connected to the second terminal of the thirteenth switch 307 and the third terminal of the fourteenth switch 309. The second terminal of the ninth capacitor 308 is connected to the first terminal of the first inductor 201. The third terminal of the thirteenth switch 307 is connected to the first terminal of the fourth capacitor 302. The second terminal of the fourteenth switch 309 is connected to the third terminal of the seventh switch 303 and the first terminal of the tenth capacitor 310. The second terminal of the tenth capacitor 310 is connected to the first terminal of the second inductor 301.

The controller 40 is connected to the first terminal of the eleventh switch 207, the first terminal of the twelfth switch 209, the first terminal of the thirteenth switch 307 and the first terminal of the fourteenth switch 309.

Figure 8:
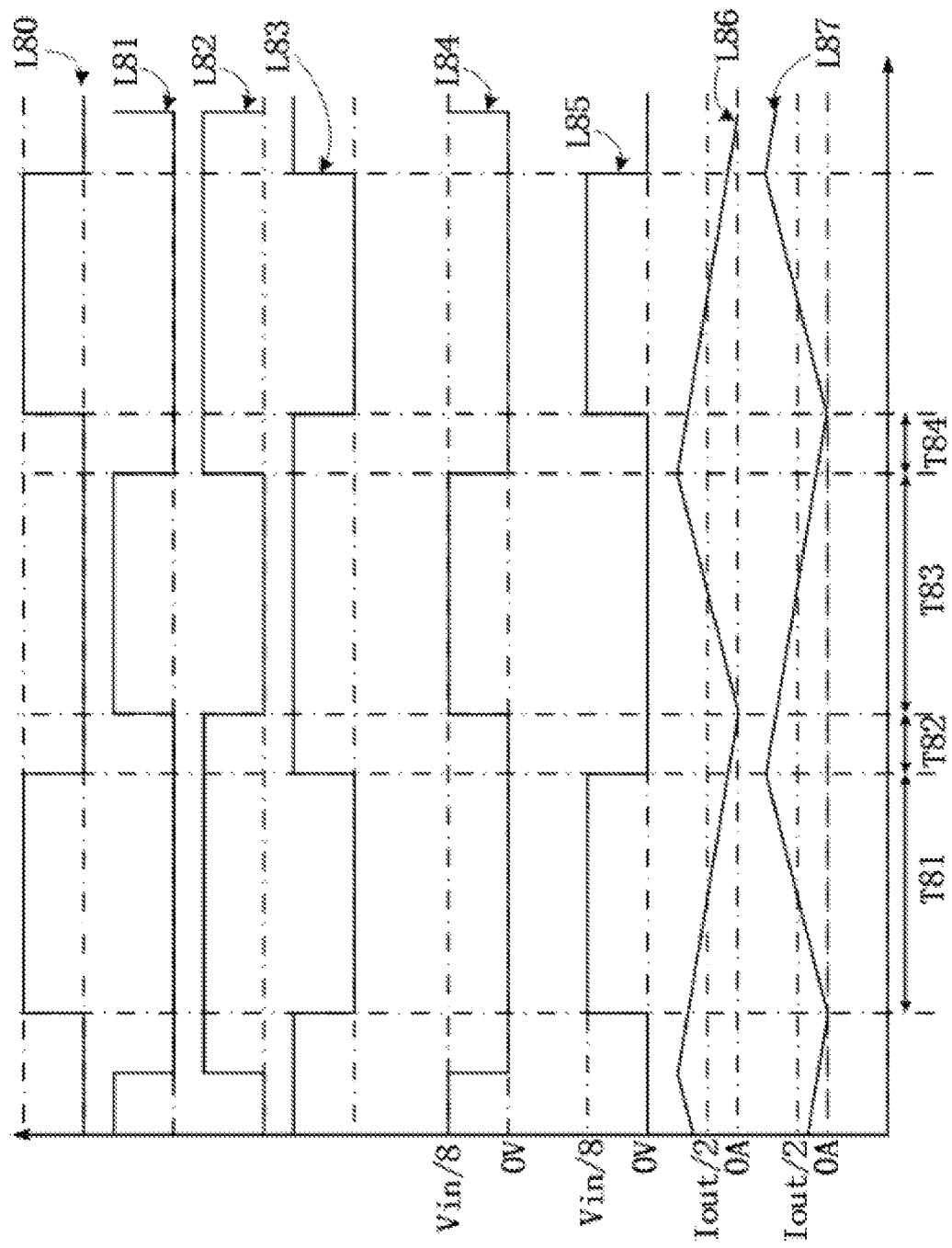
FIG. 8 is a schematic diagram of each signal in the voltage conversion circuit shown in FIG. 7 provided by an embodiment of the present application.

Referring to FIG. 7 and FIG. 8 together, FIG. 8 shows waveforms of each control signal in the circuit structure described in FIG. 7. As shown in FIG. 8, the curve L80 is a waveform of the control signals of the first switch 102, the fourth switch 106, the fifth switch 203, the eleventh switch 207 and the fourteenth switch 309; the curve L81 is a waveform of the control signals of the second switch 103, the third switch 105, the seventh switch 303, the twelfth switch 209 and the thirteenth switch 307; the curve L82 is a waveform of the control signal of the eighth switch 304; the curve L83 is a waveform of the control signal of the sixth switch 204; the curve L84 is a waveform of the voltage on the second connection point P2; the curve L85 is the schematic diagram of the voltage on the first connection point P1; the curve L86 is a waveform of the current flowing through the first inductor 201; the curve L87 is a waveform of the current flowing through the second inductor 301. The sum of time interval T81, time interval T82, time interval T83 and time interval T84 is an operating cycle. In the time interval T81 the operating state corresponds to the first operating state of the operating cycle. The operating state within the time interval T82 corresponds to the second operating state of the operating cycle, and the operating state within the time interval T83 corresponds to the third operating state of the operating cycle. The operating state within the time interval T84 corresponds to the fourth operating state of the operating cycle.

Specifically, in this embodiment, the controller 40 is further configured to: control the first switch 102, the fourth switch 106, the fifth switch 203, the eighth switch 304, the eleventh switch 207 and the fourteenth switch 309 to be turned on, and control the other switches to be turned off in the first operating state of the operating cycle; in the second operating state of the operating cycle, control the sixth switch 204 and the eighth switch 304 to be turned on, and control the other switches to be turned off; in the third operating state of the operating cycle, control the second switch 103, the third switch 105, the sixth switch 204, the seventh switch 303, the twelfth switch 209 and the thirteenth switch 307 to be turned on, and the other switches are controlled to be turned off; in the fourth operating state of the operating cycle, control the sixth switch 204 and the eighth switch 304 to be turned on, and control the other switches to be turned off.

Among them, the first switch 102, the second switch 103, the third switch 105, the fourth switch 106, the fifth switch 203, the seventh switch 303, the eleventh switch 207, the twelfth switch 209, the thirteenth switch 307 and the fourteenth switches 309 are all turned on and off alternately with the first duty cycle D, and the sixth switch 204 and the eighth switch 304 are alternately turned on and off with a second duty cycle (1-D) complementary to the first duty cycle D, so that the ratio between the voltage at the input terminal VI and the voltage at the output terminal VO is 2N:D. N is an even number equal or greater than 4. The ratio between the voltage at the input terminal VI and the voltage at the output terminal VO in the circuit shown in FIG. 7 is 8:D.

In this embodiment, through modifying the circuit structure shown in FIG. 2 by disconnecting the connection between the third capacitor 202, the fifth switch 203 and the first inductor 201, and then inserting the seventh capacitor 208, the eighth capacitor 210, the eleventh switch 207 and the twelfth switch 209, and disconnecting the connection between the fourth capacitor 302, the seventh switch 303 and the second inductor 301, and then inserting the ninth capacitor 308, tenth capacitor 310, the thirteenth switches 307 and the fourteenth switch 309, the modified circuit can achieve a higher ratio between the voltage at the input terminal VI and the voltage at the output terminal VO. For the specific implementation process of this embodiment, reference may be made to the description of FIG. 2 and FIG. 3, and details are not repeated here. Meanwhile, the seventh capacitor 208, the eighth capacitor 210, the eleventh switch 207, the twelfth switch 209, the ninth capacitor 308, the tenth capacitor 310, the thirteenth switch 307 and the fourteenth switch 309 can be used as an extension module, which can be cascaded according to the method shown in FIG. 7 to further expand the circuit and increase the ratio between the voltage at the input terminal VI and the voltage at the output terminal VO. For each added multi-level cascaded expansion module, the voltage conversion ratio is increased from 2N:D to 2(N+1):D, so that any voltage ratio of 2N:D can be achieved, where N is an even number equal or greater than 4.

It can be understood that the circuit structure shown in FIG. 7 can also adopt another control scheme provided by the embodiment of the present application. That is, a control scheme with six operating states in one operating cycle. The specific implementation process can refer to the implementation process of the embodiment shown in FIG. 4.

Figure 9:
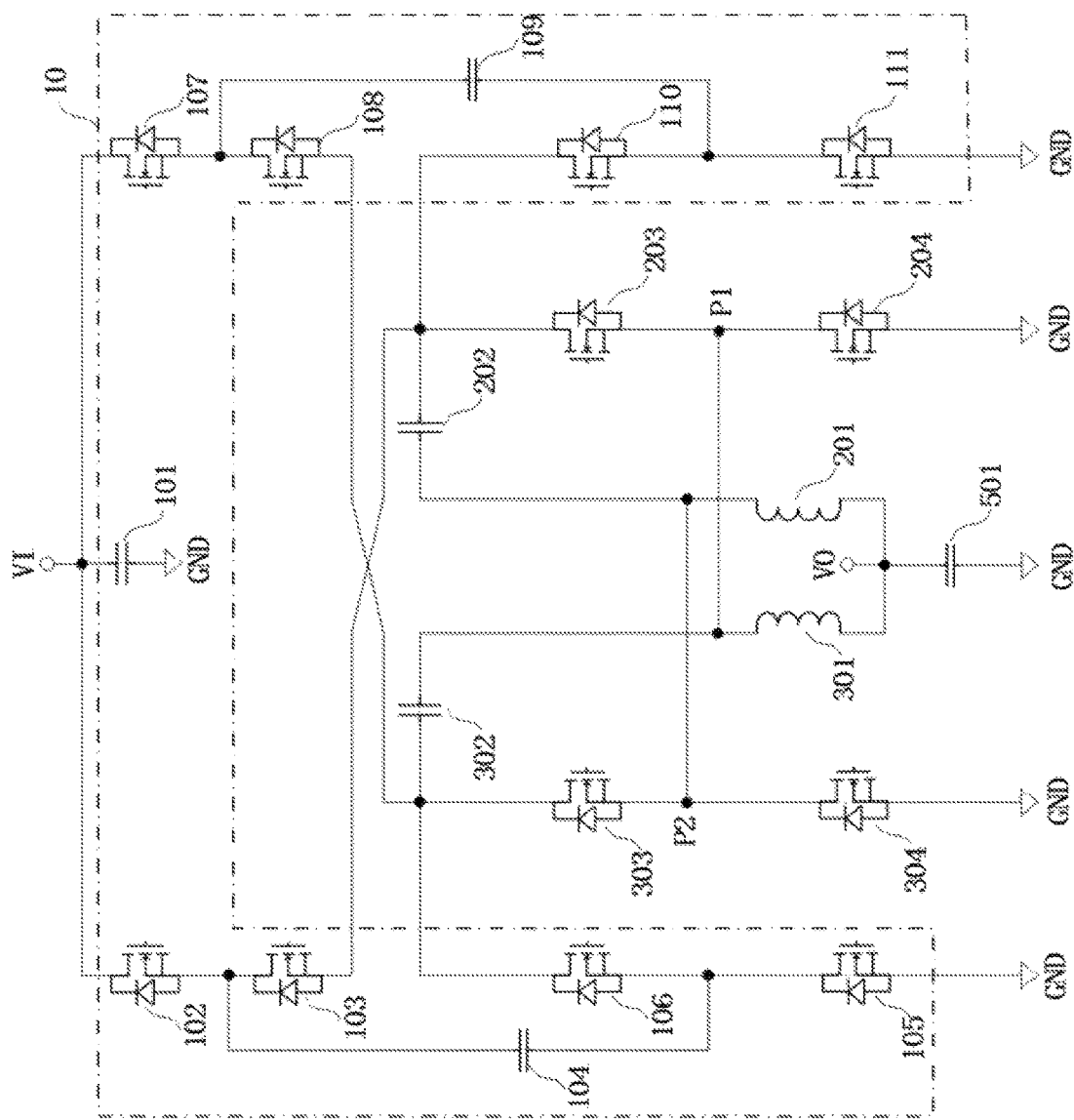
FIG. 9 is a schematic diagram of a circuit structure of a voltage conversion circuit provided by another embodiment of the present application.

In one embodiment, as shown in FIG. 9, the first energy storage branch 10 further includes an eleventh capacitor 109, a fifteenth switch 107, a sixteenth switch 108, a seventeenth switch 110 and an eighteenth switch 111.

The third terminal of the fifteenth switch 107 is connected to the input terminal VI. The second terminal of the fifteenth switch 107 is connected to the first terminal of the eleventh capacitor 109 and the third terminal of the sixteenth switch 108. The second terminal of the sixteenth switch 108 is connected to the first terminal of the fourth capacitor 302. The second terminal of the eleventh capacitor 109 is connected to the second terminal of the seventeenth switch 110 and the third terminal of the eighteenth switch 111. The second terminal of the eighteenth switch 111 is grounded to GND. The third terminal of the seventeenth switch 110 is connected to the first terminal of the third capacitor 202.

The controller 40 is connected to the first terminal of the fifteenth switch 107, the first terminal of the sixteenth switch 108, the first terminal of the seventeenth switch 110 and the first terminal of the eighteenth switch 111.

Figure 10:
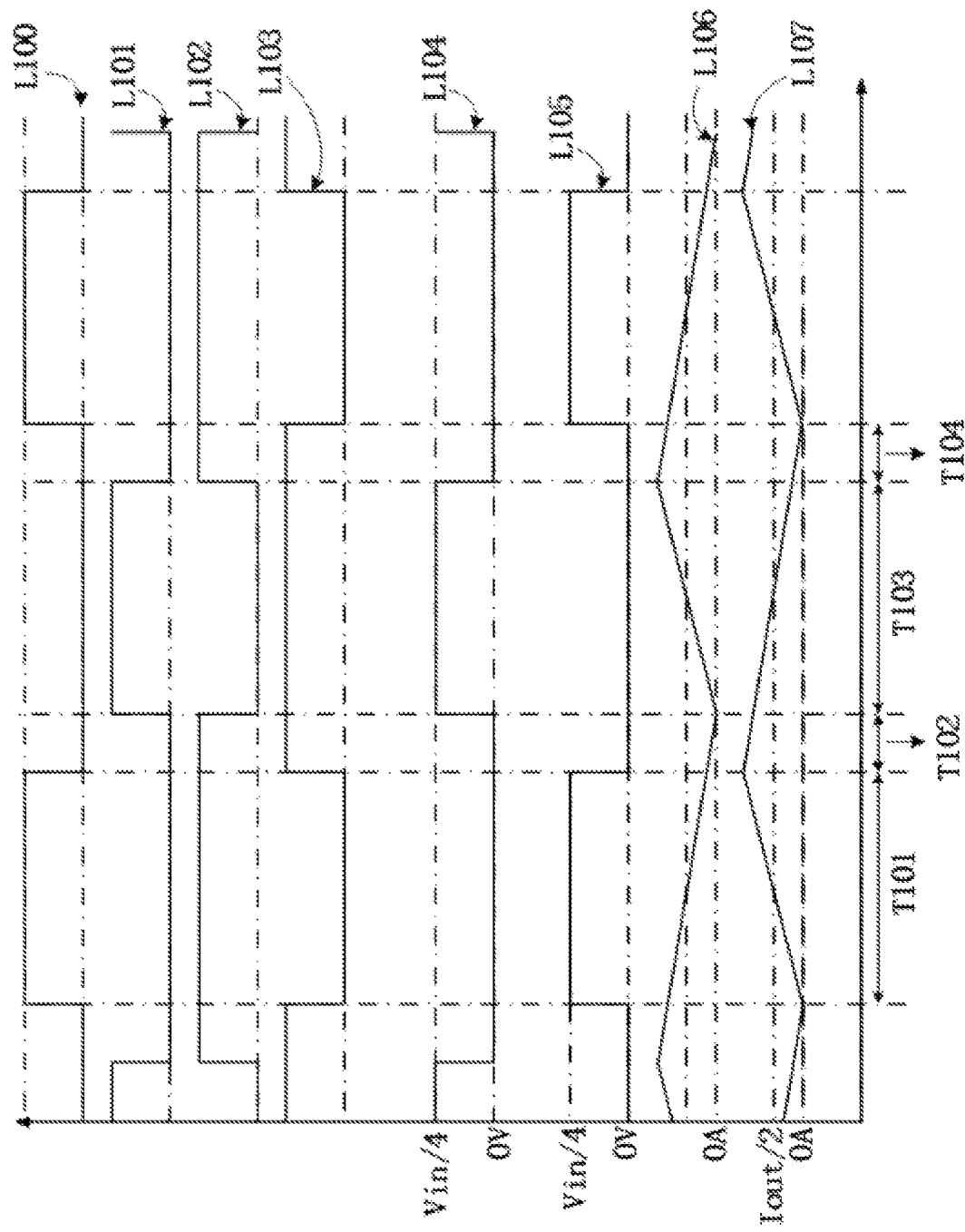
FIG. 10 is a schematic diagram of each signal in the voltage conversion circuit shown in FIG. 9 provided by an embodiment of the present application.

Referring to FIG. 9 and FIG. 10 together, FIG. 10 shows waveforms of each signal in the circuit structure described in FIG. 9. As shown in FIG. 10, the curve L100 is a waveform of the control signals of the first switch 102, the fourth switch 106, the fifth switch 203, the sixteenth switch 108 and the eighteenth switch 111; the curve L101 is the waveform of the control signals of the second switch 103, the third switch 105, the seventh switch 303, the fifteenth switch 107 and the seventeenth switch 110; the curve L102 is the waveform of the control signal of the eighth switch 304; the curve L103 is the waveform of the control signal of the sixth switch 204; the curve L104 is the waveform of the voltage on the second connection point P2; the curve L105 is the waveform of the voltage on the first connection point P1; the curve L106 is the waveform of the current flowing through the first inductor 201; the curve L 107 is a waveform of the current flowing through the second inductor 301. The sum of the time interval T101, the time interval T102, the time interval T103 and the time interval T104 is an operating cycle. Within the time interval T101, the operating state corresponds to the first operating state of the operating cycle. The operating state within the time interval T102 corresponds to the second operating state of the operating cycle, and the operating state within the time interval T103 corresponds to the third operating state of the operating cycle state. The operating state in the time interval T104 corresponds to the fourth operating state of the operating cycle.

Specifically, in this embodiment, the controller 40 is further configured to: control the first switch 102, the fourth switch 106, the fifth switch 203, the eighth switch 304, the sixteenth switch 108 and the eighteenth switch 111 to be turned on, and control the other switches to be turned off; in the second operating state of an operating cycle, control the sixth switch 204 and the eighth switch 304 to be turned on, and control the other switches to be turned off; in the third operating state of the operating cycle, control the second switch 103, the third switch 105, the sixth switch 204, the seventh switch 303, the fifteenth switch 107 and the seventeenth switch 110 to be turned on, and control the other switches to be turned off; in the fourth operating state of the operating cycle, control the sixth switch 204, the eighth switch 304 to be turned on, and control the other switches to be turned off.

Among them, the first switch 102, the second switch 103, the third switch 105, the fourth switch 106, the fifth switch 203, the seventh switch 303, the fifteenth switch 107, the sixteenth switch 108, the seventeenth switch 110 and the eighteenth switch 111 are turned on and off alternately with the first duty cycle D. The sixth switch 204 and the eighth switch 304 are alternately turned on and off with the second duty cycle (1-D) complementary to the first duty cycle, so that the ratio between the voltage at the input terminal VI and the voltage at the output terminal VO is 2N:D, and N is an even number equal or greater than 2. In the circuit shown in FIG. 9, the ratio between the voltage at the input terminal VI and the voltage at the output terminal VO is 4:D. That is, the voltage at the output terminal VO is D/4 of the voltage at the input terminal VI.

In this embodiment, the first switch 102, the fourth switch 106, the fifth switch 203, the sixteenth switch 108, and the eighteenth switch 111 have the same conduction phase and duration, and the conduction time in the steady state is DxTs, where D is the first duty cycle and Ts is the period. The second switch 103, the third switch 105, the seventh switch 303, the fifteenth switch 107, and the seventeenth switch 110 have the same conduction phase and duration, and the conduction time in a steady state is DxTs. The conduction phase of the first switch 102 is opposite to the conduction phase of the second switch 103. The control signal of the sixth switch 204 is complementary to the control signal of the first switch 102. Similarly, the control signal of the eighth switch 304 is complementary to the control signal of the second switch 103. The duty cycles of the sixth switch 204 and the eighth switch 304 are both the second duty cycle (1-D) that is complementary to the first duty cycle D.

The same control scheme can be applied to circuit structures with higher step-down ratios obtained by extending the second energy storage branch 20 and the third energy storage branch 30 based on the voltage conversion circuit 100 in FIG. 9. The ratio between the voltage at the input terminal VI and the voltage at the output terminal VO is 2N:D, and N is an even number equal or greater than 2. The specific circuit expansion method is similar to the method of expanding from the circuit in FIG. 2 to the circuit in FIG. 7, which will be described in more detail in the following paragraphs.

During steady state operation, the voltage drops across the second capacitor 104, the eleventh capacitor 109, the third capacitor 202 and the fourth capacitor 302 are Vin/2, Vin/2, Vin/4 and Vin/4, respectively. As shown in FIG. 10, for the voltage conversion circuit 100, each operating cycle includes four operating states. In the first operating state of the operating cycle, that is, within the time interval T101, the first switch 102, the fourth switch 106, the fifth switch 203, the eighth switch 304, the sixteenth switch 108 and the eighteenth switch 111 are turned on, while the other switches are kept off, the second inductor 301 is in a charging state, and the voltage at the second terminal of the second inductor 301 is recorded as VOUT, then the voltage at the first terminal of the second inductor 301 is Vin/4. The current flowing through the second inductor 301 comes from the charging of the second capacitor 104 and the fourth capacitor 302 by the input power supply and the discharging of the fourth capacitor 302 by the eleventh capacitor 109, and the discharging of the second inductor 301 by the third capacitor 202. The first inductor 201 is in a discharging state, the first terminal of the first inductor 201 is grounded to GND, and the voltage at the second terminal of the first inductor 201 is VOUT.

In the third operating state of the operating cycle, that is, in the time interval T103, the second switch 103, the third switch 105, the sixth switch 204, the seventh switch 303, the fifteenth switch 107, and the seventeenth switch 110 are turned on, and the other switches remain off. The first inductor 201 is in a charging state, and the voltages at the two terminals of the first inductor 201 are Vin/4 and VOUT, respectively. The current of the first inductor 201 comes from the charging of the eleventh capacitor 109 and the third capacitor 202 by the input power supply, the discharging of the third capacitor 202 through the second capacitor 104, and the discharging of the first inductor 201 by the fourth capacitor 302. The second inductor 301 is in a discharging state. The first terminal of the second inductor 301 is grounded to GND, and the voltage at the second terminal of the second inductor 301 is VOUT.

The second operating state of the operating cycle is consistent with the fourth operating state. That is, during the time interval T102 or the time interval T104, the sixth switch 204 and the eighth switch 304 are turned on, and the other switches are kept turned off. In this case, both the first inductor 201 and the second inductor 301 are in a discharging state. The first terminal of the second inductor 301 and the first terminal of the first inductor 201 are both grounded to GND, and the voltage at the second terminal of the second inductor 301 and the voltage at the second terminal of the first inductor 201 are VOUT.

In sum, in one operating cycle, the first inductor 201 is charged in the third operating state, and discharged in the first operating state, the second operating state and the fourth operating state; the second inductor 301 is charged in the first operating state and discharged in the second operating state, the third operating state and the fourth operating state. Therefore, the output voltage of the voltage conversion circuit 100 can be obtained. That is, the voltage VOUT at the output terminal VO is Vin×D/4, and the output voltage of the voltage conversion circuit 100 can be adjusted by controlling the duty cycle D.

It can be seen that the voltage conversion circuit 100 shown in FIG. 9 is a dual-phase structure, while the first energy storage branch of the voltage conversion circuit 100 shown in FIG. 2 is a single-phase structure. Because of this, the voltage conversion circuit 100 shown in FIG. 9 can have a smaller output ripple current than the voltage conversion circuit 100 shown in FIG. 2, and requires less input capacitance.

It can be understood that the eleventh capacitor 109, the fifteenth switch 107, the sixteenth switch 108, the seventeenth switch 110 and the eighteen switches 111 can be added to the voltage conversion circuits 100 in any embodiment of the present application with reference to the manner shown in FIG. 9, which can expand the single-phase first energy storage branch into a dual-phase first energy storage branch.

Figure 11:
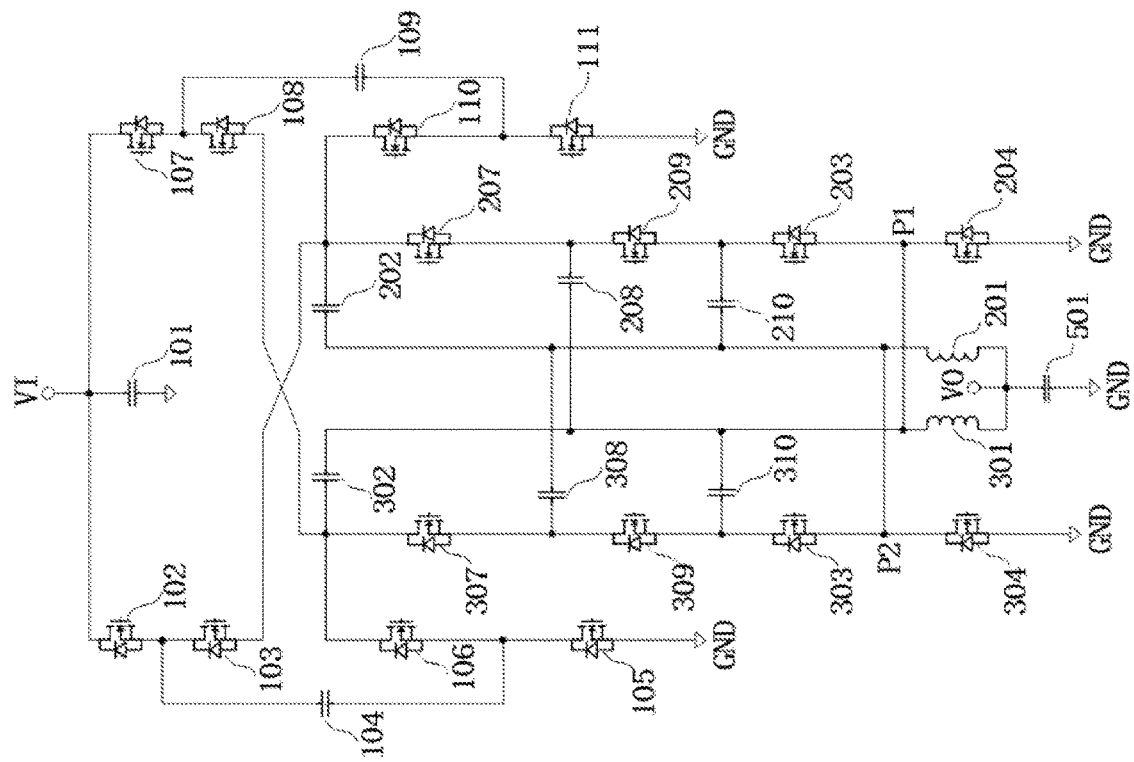
FIG. 11 is a schematic diagram of a circuit structure of a voltage conversion circuit provided by another embodiment of the application.

For example, the voltage conversion circuit 100 shown in FIG. 7 is shown in FIG. 11 after adding an eleventh capacitor 109, a fifteenth switch 107, a sixteenth switch 108, a seventeenth switch 110 and an eighteenth switch 111.

Specifically, in this embodiment, the controller 40 is further configured to: in the first operating state of the operating cycle, control the first switch 102, the fourth switch 106, the fifth switch 203, the eighth switch 304, the eleventh switch 207, the fourteenth switch 309, the sixteenth switch 108, and the eighteenth switch 111 to be turned on, and control the other switches to be turned off; in the second operating state of the operating cycle, control the sixth switch 204, the eighth switch 304 to be turned on, and controls other switches to be turn off; in the third operating state of the operating cycle, control the second switch 103, the third switch 105, the sixth switch 204, the seventh switch 303, the twelfth switch 209, the thirteenth switch 307, the fifteenth switch 107, and the seventeenth switch 110 to be turned on, and control other switches to be turned off; in the fourth operating state of the operating cycle, control the sixth switch 204 and the eighth switch 304 to be turned on, and control the other switches to be turn off.

Among them, the first switch 102, the second switch 103, the third switch 105, the fourth switch 106, the fifth switch 203, the seventh switch 303, the eleventh switch 207, the twelfth switch 209, the thirteenth switch 307, the fourteenth switch 309, the fifteenth switch 107, the sixteenth switch 108, the seventeenth switch 110, and the eighteenth switch 111 are alternately turned on and off with the first duty cycle D. The sixth switch 204 and the eighth switches 304 are alternately turned on and off with a second duty cycle (1-D) complementary to the first duty cycle, so that the ratio between the voltage at the input terminal VI and the voltage at the output terminal VO is 2N:D, and N is an even number equal or greater than 4. In the circuit shown in FIG. 11, the ratio between the voltage at the input terminal VI and the voltage at the output terminal VO is 8:D.

Similarly, the circuit structure shown in FIG. 11 can also adopt the method provided by the embodiment of the present application of cascading multiple expansion modules in the second energy storage branch 20 and the third energy storage branch 30 to increase the voltage conversion ratio. For each multi-level cascaded expansion module, the voltage ratio is increased from 2N:D to 2(N+1):D, so that any voltage ratio of 2N:D can be achieved, where N is an even number equal or greater than 4. For the specific implementation process, reference may be made to the implementation process of the embodiments shown in FIG. 2 and FIG. 7, which easily understandable by those skilled in the art, and will not be repeated here.

Similarly, the circuit structure shown in FIG. 11 can also adopt another control scheme provided by the embodiment of the present application. That is, a control scheme with six operating states in one operating cycle, the specific implementation process can refer to the implementation process of the embodiment shown in FIG. 4.

Figure 12:
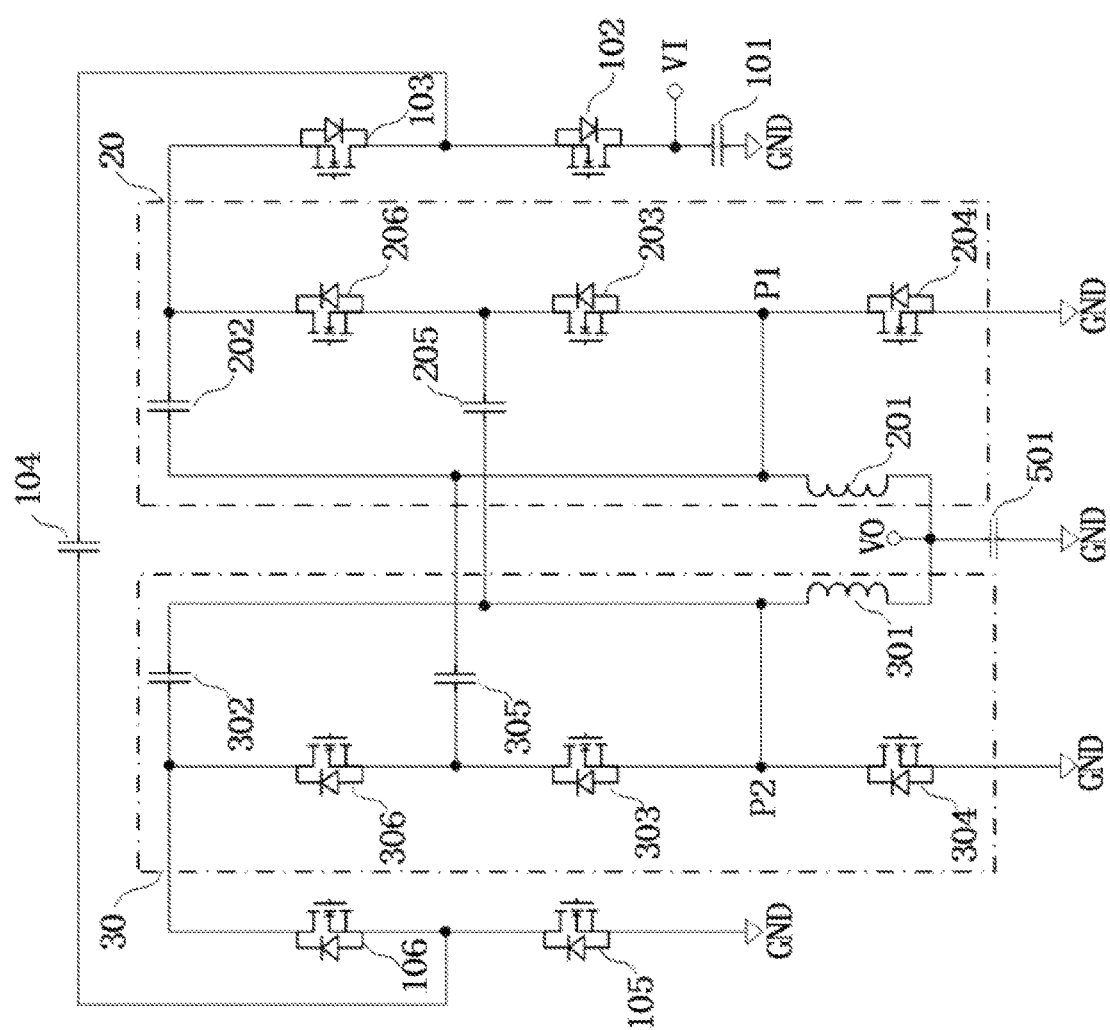
FIG. 12 is a schematic diagram of a circuit structure of a voltage conversion circuit provided by another embodiment of the present application.

In an embodiment, referring to FIG. 1 and FIG. 12 together, when N is an odd number equal or greater than 3, the second energy storage branch 20 includes a third capacitor 202, a first inductor 201, a fifth switch 203, a six switch 204, a fifth capacitor 205 and a ninth switch 206. The third energy storage branch 30 includes a fourth capacitor 302, a second inductor 301, a seventh switch 303, an eighth switch 304, a sixth capacitor 305 and a tenth switch 306.

The first terminal of the third capacitor 202 is connected to the third terminal of the first energy storage branch 10 and the third terminal of the ninth switch 206. The third terminal of the fifth switch 203 is connected to the second terminal of the ninth switch 206 and the first terminal of the fifth capacitor 205. The second terminal of the fifth capacitor 205 is connected to the second terminal of the fourth capacitor 302, the first terminal of the second inductor 301, the second terminal of the seventh switch 303 and the third terminal of the eighth switch 304. The second terminal of the fifth switch 203 is connected to the third terminal of the sixth switch 204, the first terminal of the first inductor 201, the second terminal of the third capacitor 202 and the first terminal of the sixth capacitor 305. The second terminal of the sixth switch 204 is grounded to GND. The second terminal of the first inductor 201 is connected to the second terminal of the second inductor 301 and the output terminal VO. The first terminal of the fourth capacitor 302 is connected to the third terminal of the tenth switch 306 and the fourth terminal of the first energy storage branch 10. The third terminal of the seventh switch 303 is connected to the second terminal of the sixth capacitor 305 and the second terminal of the tenth switch 306 terminal. The second terminal of the eighth switch 304 is grounded to GND.

The first terminal of the third capacitor 202 is the first terminal of the second energy storage branch 20. The second terminal of the third capacitor 202 is the third terminal of the second energy storage branch 20. The first terminal of the fifth capacitor 205 is the second terminal of the second energy storage branch 20. The second terminal of the first inductor 201 is the fourth terminal of the second energy storage branch 20, and the first terminal of the fourth capacitor 302 is the first terminal of the third energy storage branch 30. The second terminal of the fourth capacitor 302 is the third terminal of the third energy storage branch 30. The first terminal of the sixth capacitor 305 is the second terminal of the third energy storage branch 30. The second terminal of the second inductors 301 is the fourth terminal of the third energy storage branch 30.

The controller 40 is connected to the first terminal of the fifth switch 203, the first terminal of the sixth switch 204, the first terminal of the seventh switch 303, the first terminal of the eighth switch 304, the first terminal of the ninth switch 206 and the first terminal of the tenth switch 306.

Meanwhile, the voltage conversion circuit 100 further includes a first filter capacitor 501. The first terminal of the first filter capacitor 501 is connected to the output terminal VO, and the second terminal of the first filter capacitor 501 is grounded to GND.

Figure 13:
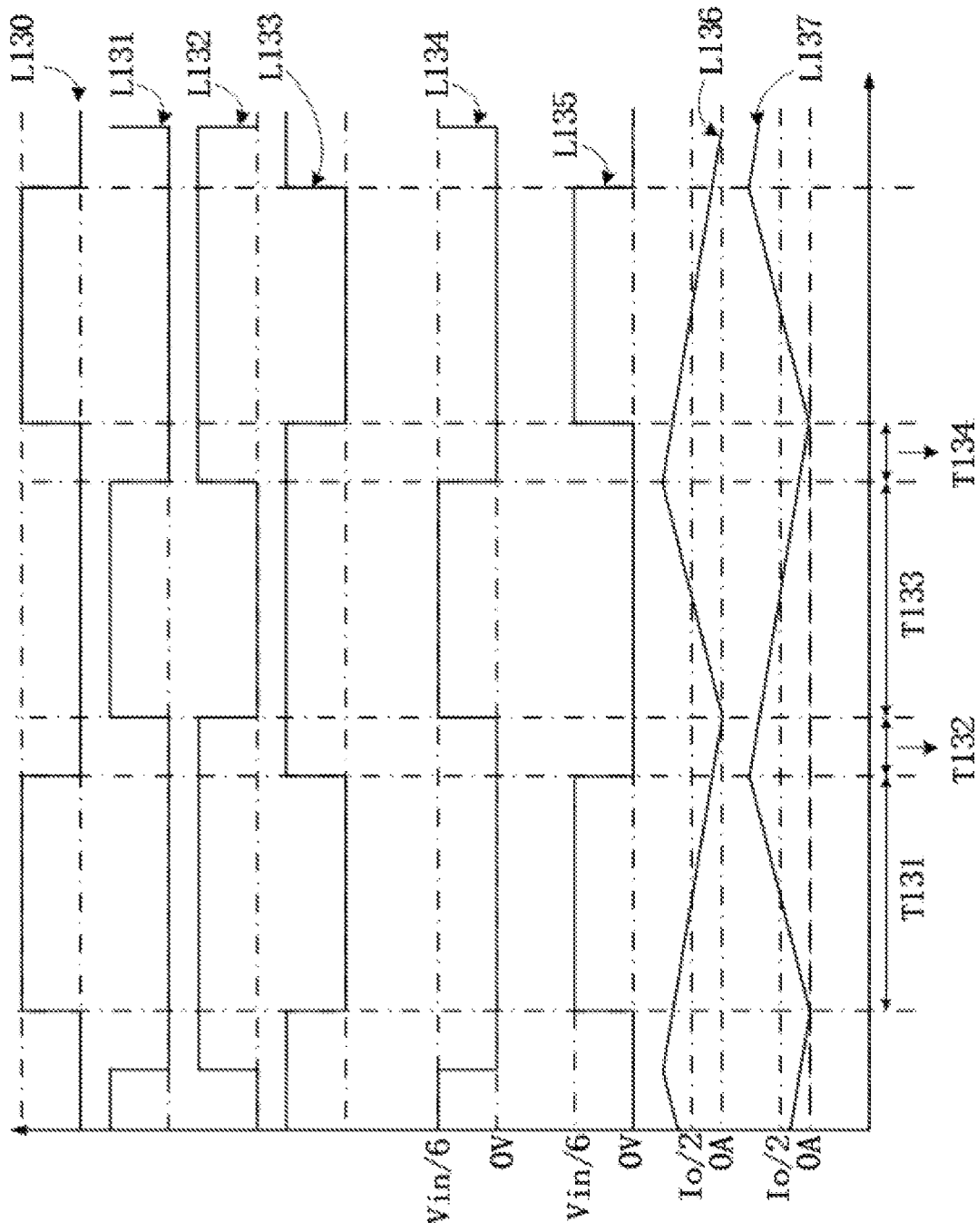
FIG. 13 is a schematic diagram of each signal in the voltage conversion circuit shown in FIG. 12 provided by an embodiment of the present application.

The operating principle of the circuit structure shown in FIG. 12 will be described below with reference to FIG. 12 and FIG. 13. FIG. 13 shows waveforms of each signal in the circuit structure shown in FIG. 12. In this embodiment, the curve L130 is a waveform of the control signals of the first switch 102, the fourth switch 106, the seventh switch 303 and the ninth switch 206; the curve L131 is, the waveform of the control signals of the second switch 103, the third switch 105, the fifth switch 203 and the tenth switch 306; the curve L132 is the waveform of the control signal of the sixth switch 204; the curve L133 is the waveform of the control signal of the eighth switch 304; the curve L134 is a waveform of the voltage at the first connection point P1; the curve L135 is the waveform of the voltage at the second connection point P2; the curve L136 is the waveform of the current flowing through the first inductor 201; the curve L137 is the waveform of the current flowing through the second inductor 301. The sum of the time interval T131, the time interval T132, the time interval T133 and the time interval T134 is an operating cycle. The operating state in the time interval T131 corresponds to the first operating state of the operating cycle. The operating state within the time interval T132 corresponds to the second operating state of the operating cycle. The operating state within the time interval T133 corresponds to the third operating state of the operating cycle and the operating state within the time interval T134 corresponds to the fourth operating state of the operating cycle. Vin is the voltage at the power input on the input terminal VI. Tout is the current output at the output terminal VO. The first connection point P1 is the connection point between the second terminal of the fifth switch 203 and the third terminal of the sixth switch 204. The second connection point P2 is the connection point between second terminal of the seventh switch 303 and the third terminal of the eighth switch 304.

Specifically, in this embodiment, the controller 40 is further configured to: in the first operating state of the operating cycle, control the first switch 102, the fourth switch 106, the sixth switch 204, the seventh switch 303, the sixth switch 303, the nine switches 206 to be turned on, and control the other switches to be turned off; in the second operating state of the operating cycle, control the sixth switch 204 and the eighth switch 304 to be turned on, and control the other switches to be turned off; in the third operating state of the operating cycle, control the second switch 103, the third switch 105, the fifth switch 203, the eighth switch 304 and the tenth switch 306 to be turned on, and control the other switches to be turned off; in the fourth operating state of the operating cycle, control the sixth switch 204 and the eighth switch 304 to be turned on, and control the other switches to be turned off.

The first switch 102, the second switch 103, the third switch 105, the fourth switch 106, the fifth switch 203, the seventh switch 303, the ninth switch 206, and the tenth switch 306 all alternate turns on and off with the first duty cycle D. The sixth switch 204 and the eighth switch 304 are alternately turned on and off with a second duty cycle (1-D) complementary to the first duty cycle, so that the ratio between the voltage at the input terminal VI and the voltage at the output terminal VO is 2N:D. N is an odd number equal or greater than 3. In the circuit shown in FIG. 12, the ratio between the voltage at the input terminal VI and the voltage at the output terminal VO is 6:D.

In this embodiment, the first switch 102, the fourth switch 106, the seventh switch 303, and the ninth switch 206 have the same conduction phase and duration, and the conduction time in a steady state is DxTs, where D is the first duty cycle, Ts is the period. The second switch 103, the third switch 105, the fifth switch 203, and the tenth switch 306 have the same conduction phase and duration, and the conduction time in a steady state is DxTs. The conduction phase of the first switch 102 is opposite to the conduction phase of the second switch 103. The control signal of the eighth switch 304 is complementary to the control signal of the first switch 102. Similarly, the control signal of the sixth switch 204 is complementary to the control signal of the second switch 103. The duty cycles of the control signal of the sixth switch 204 and the eighth switch 304 are the second duty cycle (1-D) that is complementary to the first duty cycle D.

The same control method can also be applied to a circuit with a higher step-down ratio obtained by extending the voltage conversion circuit 100 in FIG. 12, so that the ratio between the voltage at the input terminal VI and the voltage at the output terminal VO is 2N:D, and N is an odd number equal or greater than 3. The specific circuit expansion method will be described in detail in the following paragraphs.

During steady state operation, the voltage across the second capacitor 104, the third capacitor 202, the fourth capacitor 302, the fifth capacitor 205 and the sixth capacitor 305 in the voltage conversion circuit 100 are Vin/2, Vin/3, Vin/3, Vin/6 and Vin/6 respectively. As shown in FIG. 13, for the voltage conversion circuit 100, each operating cycle includes four operating states. In the first operating state of the operating cycle, that is, within the time interval T131, the first switch 102, the fourth switch 106, the sixth switch 204, the seventh switch 303, and the ninth switch 206 are turned on, and the other switches remain off. The second inductor 301 is in a charging state. The voltages at the two terminals of the second inductor 301 are Vin/6 and VOUT respectively. The current of the second inductor 301 comes from the input power supply charging the second capacitor 104 and the fourth capacitor 302, the third capacitor 202 discharging the fifth capacitor 205, and the sixth capacitor 305 discharging the second inductor 301. The first inductor 201 is in a discharging state. The first terminal of the first inductor 201 is grounded to GND, and the voltage at the second terminal of the first inductor 201 is VOUT.

In the third operating state of the operating cycle, that is, the time interval T133, the second switch 103, the third switch 105, the fifth switch 203, the eighth switch 304, and the tenth switch 306 are turned on, and the other switches remain off. The first inductor 201 is in a charging state. The voltages at the two terminals of the first inductor 201 are Vin/6 and VOUT. The current of the first inductor 201 comes from the discharging of the second capacitor 104 to the third capacitor 202, and the discharging of the sixth capacitor 305 through the fourth capacitor 302, and the fifth capacitor 205 discharging the first inductor 201. The second inductor 301 is in a discharging state. The first terminal of the second inductor 301 is grounded to GND, and the voltage at the second terminal of the second inductor 301 is VOUT.

The second operating state of the operating cycle is consistent with the fourth operating state. That is, during the time interval T132 or the time interval T134, the sixth switch 204 and the eighth switch 304 are turned on, and the other switches are kept turned off. In this case, both the first inductor 201 and the second inductor 301 are in a discharging state. The first terminal of the second inductor 301 and the first terminal of the first inductor 201 are both grounded to GND. The voltage at the second terminal of the second inductor 301 and the voltage at the second terminal of the first inductor 201 are VOUT.

In sum, in one operating cycle, the first inductor 201 is charged in the third operating state, and discharged in the first operating state, the second operating state and the fourth operating state; the second inductor 301 is charged in the first operating state, and discharged in the second operating state, the third operating state and the fourth operating state. It can be concluded that the output voltage of the voltage conversion circuit 100, that is, the voltage VOUT at the output terminal VO is VinxD/6, and the output voltage of the voltage conversion circuit 100 can be adjusted by controlling the duty cycle D.

It should be noted that the circuit structure shown in FIG. 12 can also be expanded with reference to the expansion solution provided by any embodiment of the present application, and both control modes can also be used.

For example, in an embodiment, when the circuit structure shown in FIG. 12 adopts a control scheme in which one operating cycle includes six operating states, the specific implementation process is: in the first operating state of the operating cycle, control the first switch 102, the fourth switch 106, the sixth switch 204, the seventh switch 303, and the ninth switch 206 to be turned on, and control the other switches to be turned off; in the second operating state of the operating cycle, control the sixth switch 204, the eighth switch 304 to be turned on, and control other switches to be turned off; in the third operating state of an operating cycle, control the second switch 103, the third switch 105, the eighth switch 304 and the tenth switch 306 to be turned on, and control other switches to be turn off; in the fourth operating state of the operating cycle, control the second switch 103, the third switch 105, the fifth switch 203, the eighth switch 304 and the tenth switch 306 to be turned on, and control the other switches to be turned off; in the fifth operating state of the operating cycle, control the sixth switch 204 and the eighth switch 304 to be turned on, and control the other switches to be turned off; in the sixth operating state of the operating cycle, control the first switch 102, the fourth switch 106, the sixth switch 204 and the ninth switch 206 to be turned on, and control the other switches to be turned off.

The first switch 102, the second switch 103, the third switch 105, the fourth switch 106, the ninth switch 206 and the tenth switch 306 are alternately turned on and off with the first duty cycle D. The sixth switch 204, the eighth switch 304 and the eighth switch 304 are alternately turned on and off at a second duty cycle (1-D) that is complementary to the first duty cycle. The fifth switch 203 and the seventh switch 303 are turned on and off alternately with a third duty cycle that is smaller than the first duty cycle D so that the ratio between the voltage at the input terminal VI and the voltage at the output terminal VO is 2N:D, and N is an odd number equal or greater than 3, where in the circuit shown in FIG. 12, the ratio between voltage at the input terminal VI and the voltage at the output VO is 6:D.

Figure 14:
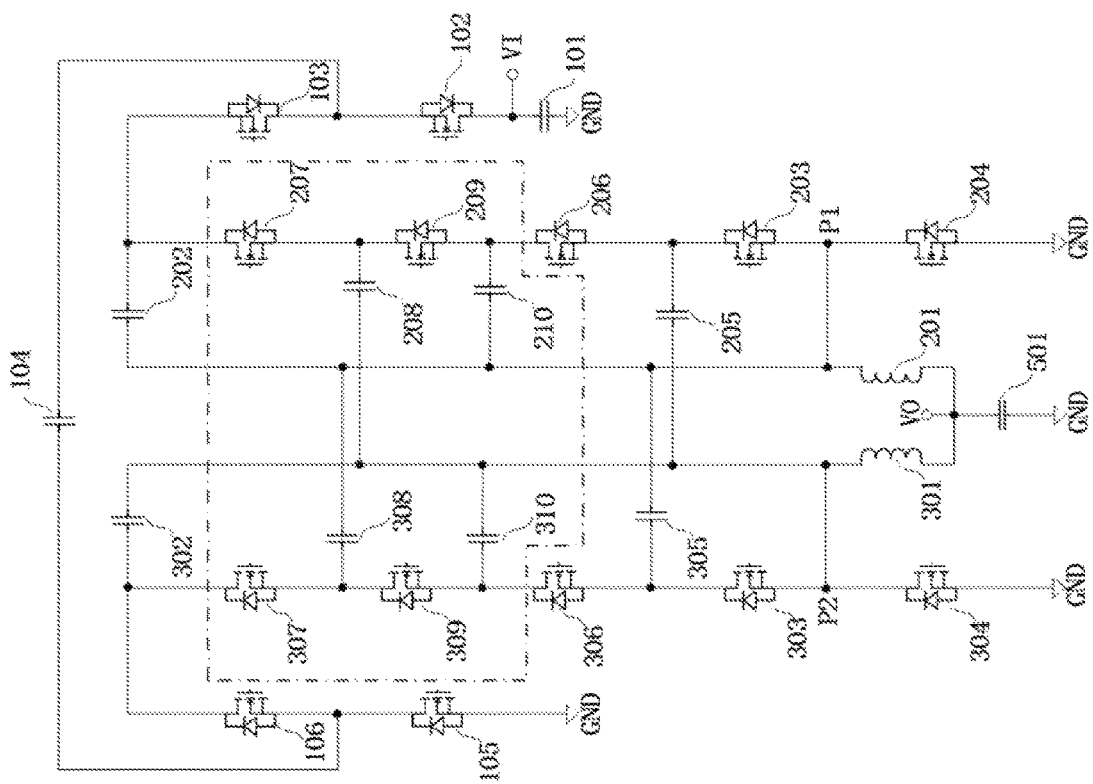
FIG. 14 is a schematic diagram of a circuit structure of a voltage conversion circuit provided by another embodiment of the present application.

For another example, referring to the method shown in FIG. 7, adding the seventh capacitor 208, the eighth capacitor 210, the eleventh switch 207, the twelfth switch 209, the ninth capacitor 308, the tenth capacitors 310, the thirteenth switch 307 and the fourteenth switch 309 to the circuit shown in FIG. 12, a voltage conversion circuit 100 shown in FIG. 14 can be obtained.

As shown in FIG. 14, the first terminal of the seventh capacitor 208 is connected to the second terminal of the eleventh switch 207 and the third terminal of the twelfth switch 209. The second terminal of the seventh capacitor 208 is connected to the first of the second inductor 301. The third terminal of the eleventh switch 207 is connected to the first terminal of the third capacitor 202. The second terminal of the twelfth switch 209 is connected to the third terminal of the ninth switch 206 and the first terminal of the eighth capacitor 210. The second terminal of the eighth capacitor 210 is connected to the first terminal of the first inductor 201. The first terminal of the ninth capacitor 308 is connected to the second terminal of the thirteenth switch 307 and the third terminal of the fourteenth switch 309. The second terminal of the ninth capacitor 308 is connected to the first terminal of the first inductor 201. The third terminal of the thirteenth switch 307 is connected to the first terminal of the fourth capacitor 302. The second terminal of the fourteenth switch 309 is connected to the third terminal of the tenth switch 306 and the first terminal of the tenth capacitor 310. The second terminal of the tenth capacitor 310 is connected to the first terminal of the second inductor 301.

The controller 40 is connected to the first terminal of the eleventh switch 207, the first terminal of the twelfth switch 209, the first terminal of the thirteenth switch 307, and the first terminal of the fourteenth switch 309.

In this embodiment, the controller 40 is further configured to: in the first operating state of an operating cycle, control the first switch 102, the fourth switch 106, the sixth switch 204, the seventh switch 303, and the ninth switch 206, the eleventh switch 207 and the fourteenth switch 309 to be turned on, and control other switches to be turned off; in the second operating state of the operating cycle, control the sixth switch 204 the eighth switch 304 to be turned on, and control the other switches to be turned off; in the third operating state of the operating cycle, control the second switch 103, the third switch 105, the fifth switch 203, the eighth switch 304, the tenth switch 306, the twelfth switch 209, the tenth switch 209, and the tenth switch 306, the thirteenth switch 307 to be turned on, and control the other switches to be turned off; in the fourth operating state of an operating cycle, control the sixth switch 204 and the eighth switch 304 to be turned on, and control the other switches to be turned off.

Among the switches, the first switch 102, the second switch 103, the third switch 105, the fourth switch 106, the fifth switch 203, the seventh switch 303, the ninth switch 206, the tenth switch 306, the eleventh switch 207, the tenth switch 306, the twelfth switch 209, the thirteenth switch 307, and the fourteenth switch 309 are alternately turned on and off with the first duty cycle D. The sixth switch 204 and the eighth switch 304 are alternately turned on and off with the second duty cycle (1-D) complementary to the first duty cycle D, so that the ratio between the voltage at the input terminal VI and the voltage at the output terminal VO is 2N:D, and N is an odd number equal or greater than 5. In the circuit shown in FIG. 14, the ratio between the voltage at the input terminal VI and the voltage at the output terminal VO is 10:D.

In this embodiment, in the circuit structure shown in FIG. 12, the connection between the third capacitor 202 and the ninth switch 206 and the first inductor 201 is disconnected and the eleventh switch 207, the twelfth switch 209, the seventh capacitor 208 and the eighth capacitor 210 are inserted. The connection between the fourth capacitor 302, the tenth switch 306 and the second inductor 301 is disconnected, and the thirteenth switches 307, the fourteenth switch 309, the ninth capacitor 308 and tenth capacitor 310 are inserted. By expanding the circuit this way, the ratio between the voltage at the input terminal VI and the voltage at the output terminal VO can be increased. For the specific implementation process of this embodiment, reference may be made to the descriptions of FIG. 12 and FIG. 13, which will not be repeated here. Meanwhile, the seventh capacitor 208, the eighth capacitor 210, the eleventh switch 207, the twelfth switch 209, the ninth capacitor 308, the tenth capacitor 310, the thirteenth switch 307 and the fourteenth switch 309 can be used as an extension module and referring to the method shown in FIG. 14 for cascading the extension modules. By doing so, the ratio between the voltage at the input terminal VI and the voltage at the output terminal VO can be continuously increased. For cascading each multi-level expansion module, the voltage ratio increases from 2N:D to 2(N+1):D, so that any voltage ratio of 2N:D can be achieved, where N is an odd number equal or greater than 5.

For another example, referring to the method shown in FIG. 9, an eleventh capacitor 109, a fifteenth switch 107, a sixteenth switch 108, a seventeenth switch 110 and an eighteenth switches 111 are added to the circuit structure shown in FIG. 14.

In this embodiment, in the first operating state of the operating cycle, the first switch 102, the fourth switch 106, the sixth switch 204, the seventh switch 303, the ninth switch 206, the sixth switch 204, the ninth switch 206, the eleventh switch 207, the fourteenth switch 309, the sixteenth switch 108 and the eighteenth switch 111 are turned on, and the other switches are turn off; in the second operating state of the operating cycle, the sixth switch 204, the eighth switch 304 are turned on, and the other switches are turned off; in the third operating state of the operating cycle, the second switch 103, the third switch 105, and the fifth switch 203, the eighth switch 304, the tenth switch 306, the twelfth switch 209, the thirteenth switch 307, the fifteenth switch 107 and the seventeenth switch 110 are turned on, and other switches are turned off; in the fourth operating state of the operating cycle, the sixth switch 204 and the eighth switch 304 are controlled to be turned on, and other switches are controlled to be turned off.

Among the switches, the first switch 102, the second switch 103, the third switch 105, the fourth switch 106, the fifth switch 203, the seventh switch 303, the ninth switch 206, the tenth switch 306, the eleventh switch 207, the twelfth switch 209, the thirteenth switch 307, the fourteenth switch 309, the fifteenth switch 107, the sixteenth switch 108, the seventeenth switch 110, the eighteenth switches 111 are all turned on and off alternately with a first duty cycle D. The sixth switch 204 and the eighth switch 304 are turned on and off alternately with a second duty cycle (1-D) that is complementary to the first duty cycle D, so that the ratio between the voltage at the input terminal VI and the voltage at the output terminal VO is 2N:D, and N is an odd number equal or greater than 5.

Figure 15:
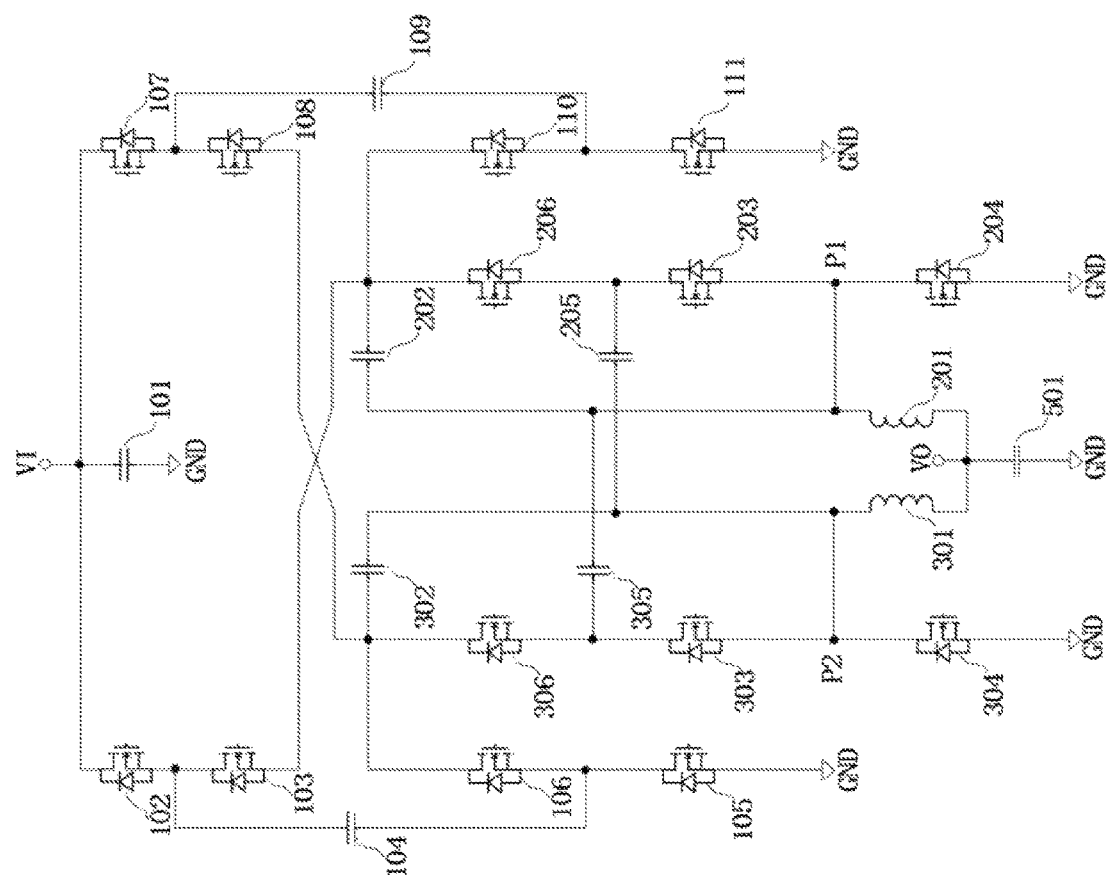
FIG. 15 is a schematic diagram of a circuit structure of a voltage conversion circuit according to another embodiment of the present application.

For another example, referred to the method shown in FIG. 9, that is, the eleventh capacitor 109, the fifteenth switch 107, the sixteenth switch 108, the seventeenth switch 110 and the eighteen switches 111 can be added to the circuit structure shown in FIG. 12 and a voltage conversion circuit 100 shown in FIG. 15 is obtained.

As shown in FIG. 15, in this embodiment, in the first operating state of an operating cycle, the first switch 102, fourth switch 106, the sixth switch 204, the seventh switch 303, and the ninth switch 206, the sixteenth switch 108 and the eighteenth switch 111 are turned on, and the other switches are turned off; in the second operating state of the operating cycle, the sixth switch 204 and the eighth switch 304 are turned on, and the other switches are turned off; in the third operating state of the operating cycle, the second switch 103, the third switch 105, the fifth switch 203, the eighth switch 304, the tenth switch 306, the fifteenth switch 107, and the seventeenth switches 110 are turned on, and the other switches are turned off; in the fourth operating state of the operating cycle, the sixth switch 204 and the eighth switch 304 are turned on, and the other switches are turned off.

Among the switches, the first switch 102, the second switch 103, the third switch 105, the fourth switch 106, the fifth switch 203, the seventh switch 303, the ninth switch 206, the tenth switch 306, the fifteenth switch 107, the sixteenth switch 108, the seventeenth switch 110, and the eighteenth switch 111 are alternately turned on and off with a first duty cycle D. The sixth switch 204 and the eighth switch 304 are turned on and off alternately with a second duty cycle (1-D) complementary to the first duty cycle, so that the ratio between the voltage at the input terminal VI and the voltage at the output terminal VO is 2N:D, and N is an odd number equal or greater than 3, where in the circuit shown in FIG. 15, the ratio between the voltage at the input terminal VI and the voltage at the output terminal VO is 6:D.

In one embodiment, the first duty cycle D is less than 50% in any embodiment of the present application. Especially when D is equal to 50%, the output voltage at the output terminal VO is the highest, and the current ripple is the smallest.

The embodiment of the present application further provides an electronic device, and the electronic device includes the voltage conversion circuit 100 in any embodiment of the present application.

Finally, it should be noted that the above embodiments are only used to illustrate the technical solutions of the present application, but not to limit them; under the thinking of the present application, the technical features in the above embodiments or different embodiments can also be combined, The steps may be carried out in any order, and there are many other variations of the different aspects of the present application as described above, which are not provided in detail for the sake of brevity; although the present application has been disclosed, skilled person should understand that it is still possible to modify the technical solutions recorded in the foregoing embodiments, or to perform equivalent replacements on some of the technical features; and these modifications or replacements do not make the essence of the corresponding technical solutions deviate from the scope of technical solutions of the implementations of the application.

What is claimed is:

1. A voltage conversion circuit comprising:
   an input terminal, an output terminal, a first energy storage branch, a second energy storage branch, a third energy storage branch and a controller, wherein:
   the input terminal is used for connecting with an input power supply, and the output terminal is used for connecting with a load, and wherein:
   the first energy storage branch includes a first capacitor, a second capacitor, a first switch, a second switch, a third switch and a fourth switch;
   the second energy storage branch includes a third capacitor, a first inductor, a fifth switch and a sixth switch; and
   the third energy storage branch includes a fourth capacitor, a second inductor, a seventh switch and an eighth switch, and wherein:
   a first terminal of the first capacitor is grounded;
   a second terminal of the first capacitor is connected to the input terminal and a third terminal of the first switch;
   a second terminal of the first switch is connected to a third terminal of the second switch and a first terminal of the second capacitor;
   a second terminal of the second switch is connected to a first terminal of the third capacitor;
   a second terminal of the second capacitor is connected to a third terminal of the third switch and a second terminal of the fourth switch;
   a second terminal of the third switch is grounded;
   a third terminal of the fourth switch is connected to a first terminal of the fourth capacitor;
   a second terminal of the sixth switch and a second terminal of the eighth switch are both grounded;
   a second terminal of the first inductor is connected to the second terminal of the second inductor and the output terminal, wherein N is an integer;
   when N is an even number greater than or equal to 2, the first terminal of the third capacitor is further connected to a third terminal of the fifth switch;
a second terminal of the fifth switch is connected to a third terminal of the sixth switch, a second terminal of the fourth capacitor and a first terminal of the second inductor;
a second terminal of the third capacitor is connected to a first terminal of the first inductor, a second terminal of the seventh switch and a third terminal of the eighth switch; and
the first terminal of the fourth capacitor is also connected to a third terminal of the seventh switch;
when N is an odd number greater than or equal to 3,
the second energy storage branch further includes a fifth capacitor and a ninth switch;
the third energy storage branch further includes a sixth capacitor and a tenth switch;
the first terminal of the third capacitor is also connected to a third terminal of the ninth switch;
the third terminal of the fifth switch is connected to a second terminal of the ninth switch and a first terminal of the fifth capacitor;
a second terminal of the fifth capacitor is connected to the second terminal of the fourth capacitor, the first terminal of the second inductor, the second terminal of the seventh switch and the third terminal of the eighth switch;
the second terminal of the fifth switch is connected to the third terminal of the sixth switch, the first terminal of the first inductor, the second terminal of the third capacitor and a first terminal of the sixth capacitor;
the first terminal of the fourth capacitor is also connected to a third terminal of the tenth switch; and
the third terminal of the seventh switch is connected to a second terminal of the sixth capacitor and a second terminal of the tenth switch; and
the controller is connected to first terminals of switches of the first energy storage branch, the second energy storage branch and the third energy storage branch, and the controller is used to control respective switches to be turned on and off so that a ratio of a voltage at the input terminal to a voltage at the output terminal is 2N:D, where D is a first duty cycle output by the controller to control the first switch, the second switch, the third switch and the fourth switch.

2. The voltage conversion circuit of claim 1, wherein the controller is further configured to:
in a first operating state in an operating cycle, control the first switch, the fourth switch, the fifth switch, and the eighth switch to be turned on, and control other remaining switches to be turned off;
in a second operating state in the operating cycle, control the sixth switch and the eighth switch to be turned on, and control other remaining switches to be turned off;
in a third operating state in the operating cycle, control the second switch, the third switch, the sixth switch, and the seventh switch to be turned on, and control other remaining switches to be turned off; and
in a fourth operating state in the operating cycle, control the sixth switch and the eighth switch to be turned on, and control other remaining switches to be turned off, and wherein:
the first switch, the second switch, the third switch, the fourth switch, the fifth switch, and the seventh switch are all turned on and off alternately with the first duty cycle D, and the sixth switch and the eighth switch are turned on and off alternately with a second duty cycle (1-D) complementary to the first duty cycle so that the ratio of the voltage at the input terminal to the voltage at the output terminal is 2N:D, and N is an even number greater than or equal to 2.

3. The voltage conversion circuit of claim 1, wherein the controller is further configured to:
in a first operating state in an operating cycle, control the first switch, the fourth switch, the fifth switch, and the eighth switch to be turned on, and control other remaining switches to be turned off;
in a second operating state in the operating cycle, control the sixth switch and the eighth switch to be turned on, and control other remaining switches to be turned off;
in a third operating state in the operating cycle, control the second switch, the third switch, and the sixth switch to be turned on, and control other remaining switches to be turned off;
in a fourth operating state in the operating cycle, control the second switch, the third switch, the sixth switch, and the seventh switch to be turned on, and control other remaining switches to be turned off;
in a fifth operating state in the operating cycle, control the sixth switch and the eighth switch to be turned on, and control other remaining switches to be turned off; and
in a sixth operating state in the operating cycle, control the first switch, the fourth switch, and the eighth switch to be turned on, and control other remaining switches to be turned off, and wherein:
the first switch, the second switch, the third switch, and the fourth switch are turned on and off alternately with the first duty cycle D, and the sixth switch and the eighth switch are turned on and off alternately with a second duty cycle (1-D) complementary to the first duty cycle D, and the fifth switch and the seventh switch are turned on and off alternately at a third duty cycle smaller than the first duty cycle D so that the ratio of the voltage at the input terminal to the voltage at the output terminal is 2N:D, and N is an even number greater than or equal to 2.

4. The voltage conversion circuit of claim 1, wherein the controller is further configured to:
in a first operating state in an operating cycle, control the first switch, the fourth switch, the sixth switch, the seventh switch, and the ninth switch to be turned on, and control other remaining switches to be turned off;
in a second operating state in the operating cycle, control the sixth switch and the eighth switch to be turned on, and control other remaining switches to be turned off;
in a third operating state in the operating cycle, control the second switch, the third switch, the fifth switch, the eighth switch, and the tenth switch to be turned on, and control other remaining switches to be turned off; and
in a fourth operating state in the operating cycle, control the sixth switch and the eighth switch to be turned on, and control other remaining switches to be turned off, and wherein:
the first switch, the second switch, the third switch, the fourth switch, the fifth switch, the seventh switch, the ninth switch, and the tenth switch are turned on and off alternately with the first duty cycle D, and the sixth switch and the eighth switch are turned on and off alternately with a second duty cycle (1-D) complementary to the first duty cycle D so that the ratio of the voltage at the input terminal to the voltage at the output terminal is 2N:D, and N is an odd number greater than or equal to 3.

5. The voltage conversion circuit of claim 1, wherein the controller is further configured to:
in a first operating state in an operating cycle, control the first switch, the fourth switch, the sixth switch, the seventh switch, and the ninth switch to be turned on, and control other remaining switches to be turned off;
in a second operating state in the operating cycle, control the sixth switch and the eighth switch to be turned on, and control other remaining switches to be turned off;
In a third operating state in the operating cycle, control the second switch, the third switch, the eighth switch, and the tenth switch to be turned on, and control other remaining switches to turn off;
in a fourth operating state in the operating cycle, control the second switch, the third switch, the fifth switch, the eighth switch, and the tenth switch to be turned on, and control other remaining switches to be turned off;
in a fifth operating state in the operating cycle, control the sixth switch and the eighth switch to be turned on, and control other remaining switches to be turned off; and
in a sixth operating state in the operating cycle, control the first switch, the fourth switch, the sixth switch, and the ninth switch to be turned on, and control other remaining switches to be turned off, and wherein:
the first switch, the second switch, the third switch, the fourth switch, the ninth switch and the tenth switch are all turned on and off alternately with the first duty cycle D, and the sixth switch and the eighth switch are turned on and off alternately with a second duty cycle (1-D) complementary to the first duty cycle D, and the fifth switch and the seventh switch are turned on and off alternately at a third duty cycle smaller than the first duty cycle D so that the ratio of the voltage at the input terminal to the voltage at the output terminal is 2N:D, and N is an odd number greater than or equal to 3.

6. The voltage conversion circuit of claim 1, wherein the second energy storage branch further comprises a seventh capacitor, an eighth capacitor, an eleventh switch and a twelfth switch, and the third energy storage branch also includes a ninth capacitor, a tenth capacitor, a thirteenth switch and a fourteenth switch, and wherein:
a first terminal of the seventh capacitor is connected to a second terminal of the eleventh switch and a third terminal of the twelfth switch;
a second terminal of the seventh capacitor is connected to the second terminal of the second inductor;
a third terminal of the eleventh switch is connected to a first terminal of the third capacitor;
a second terminal of the twelfth switch is connected to a first terminal of the eighth capacitor;
a second terminal of the eighth capacitor is connected to the first terminal of the first inductor;
a first terminal of the ninth capacitor is connected to a second terminal of the thirteenth switch and a third terminal of the fourteenth switch;
a second terminal of the ninth capacitor is connected to the first terminal of the first inductor;
a third terminal of the thirteenth switch is connected to the first terminal of the fourth capacitor;
a second terminal of the fourteenth switch is connected to a first terminal of the tenth capacitor;
a second terminal of the tenth capacitor is connected to the first terminal of the second inductor;
when N is an even number greater than or equal to 2, the second terminal of the twelfth switch is further connected to the third terminal of the fifth switch, and the second terminal of the fourteenth switch is also connected to the third terminal of the seventh switch;
when N is an odd number greater than or equal to 3, the second terminal of the twelfth switch is further connected to the third terminal of the ninth switch, and the second terminal of the fourteenth switch is further connected to the third terminal of the tenth switch; and
the controller is connected to a first terminal of the eleventh switch, a first terminal of the twelfth switch, a first terminal of the thirteenth switch, and the first terminal of the fourteenth switch.

7. The voltage conversion circuit of claim 6, wherein the controller is further configured to:
in a first operating state in an operating cycle, control the first switch, the fourth switch, the fifth switch, the eighth switch, the eleventh switch, and the fourteenth switch to be turned on, and control other remaining switches to be turned off;
in a second operating state in the operating cycle, control the sixth switch and the eighth switch to be turned on, and control other remaining switches to be turned off;
in a third operating state in the operating cycle, control the second switch, the third switch, the sixth switch, the seventh switch, the twelfth switch, and the thirteenth switch to be turned on, and control other remaining switches to be turned off; and
in a fourth operating state in the operating cycle, control the sixth switch and the eighth switch to be turned on, and control other remaining switches to be turned off, and wherein:
the first switch, the second switch, the third switch, the fourth switch, the fifth switch, the seventh switch, the eleventh switch, the twelfth switch, the thirteenth switch, and the fourteenth switch are all turned on and off alternately at the first duty cycle D, and the sixth switch and the eighth switch are turned on and off alternately at a second duty cycle (1-D) complementary to the first duty cycle D so that the ratio of the voltage at the input terminal to the voltage at the output terminal is 2N:D, and N is an even number greater than or equal to 4.

8. The voltage conversion circuit of claim 6, wherein the controller is further configured to:
in a first operating state in an operating cycle, control the first switch, the fourth switch, the sixth switch, the seventh switch, the ninth switch, the eleventh switch, the fourteenth switch to be turned on, and control other remaining switches to be turned off;
in a second operating state in the operating cycle, control the sixth switch and the eighth switch to be turned on, and control other remaining switches to be turned off;
in a third operating state in the operating cycle, control the second switch, the third switch, the fifth switch, the eighth switch, the tenth switch, the twelfth switch and the thirteenth switch to be turned on, and control other remaining switches to be turned off; and
in a fourth operating state in the operating cycle, control the sixth switch and the eighth switch to be turned on, and control other remaining switches to be turned off, and wherein:
the first switch, the second switch, the third switch, the fourth switch, the fifth switch, the seventh switch, the ninth switch, the tenth switch, the eleventh switch, the twelfth switch, the thirteenth switch, and the fourteenth switch are all turned on and off alternately with the first duty cycle D, and the sixth switch and the eighth switch are turned on and off alternately with a second duty cycle (1-D) complementary to the first duty cycle D so that the ratio of the voltage at the input terminal to the voltage at the output terminal is 2N:D, and N is an odd number greater than or equal to 5.

9. The voltage conversion circuit of claim 1, wherein the first energy storage branch further comprises an eleventh capacitor, a fifteenth switch, a sixteenth switch, a seventeenth switch and an eighteenth switch, wherein:
   a third terminal of the fifteenth switch is connected to the input terminal;
   a second terminal of the fifteenth switch is connected to a first terminal of the eleventh capacitor and a third terminal of the sixteenth switch;
   a second terminal of the sixteenth switch is connected to the first terminal of the fourth capacitor;
   a second terminal of the eleventh capacitor is connected to a second terminal of the seventeenth switch and a third terminal of the eighteenth switch;
   a second terminal of the eighteenth switch is grounded;
   a third terminal of the seventeenth switch is connected to the first terminal of the third capacitor; and
   the controller is connected to a first terminal of the fifteenth switch, a first terminal of the sixteenth switch, a first terminal of the seventeenth switch, and a first terminal of the eighteenth switch.

10. The voltage conversion circuit of claim 9, wherein the controller is further configured to:
    in a first operating state in an operating cycle, control the first switch, the fourth switch, the fifth switch, the eighth switch, the sixteenth switch, and the eighteenth switch to be turned on, and control other remaining switches to be turned off;
    in a second operating state in the operating cycle, control the sixth switch and the eighth switch to be turned on, and control other remaining switches to be turned off;
    in a third operating state in the operating cycle, control the second switch, the third switch, the sixth switch, the seventh switch, the fifteenth switch, and the seventeenth switch to be turned on, and control other remaining switches to be turned off; and
    in a fourth operating state in the operating cycle, control the sixth switch and the eighth switch to be turned on, and control other remaining switches to be turned off, and wherein:
    the first switch, the second switch, the third switch, the fourth switch, the fifth switch, the seventh switch, the fifteenth switch, the sixteenth switch, the seventeenth switch, and the eighteenth switch are all turned on and off alternately at the first duty cycle D, and the sixth switch and the eighth switch are turned on and off alternately at a second duty cycle (1-D) complementary to the first duty cycle D so that the ratio of the voltage at the input terminal to the voltage at the output terminal is 2N:D, and N is an even number greater than or equal to 2.

11. The voltage conversion circuit of claim 9, wherein the controller is further configured to:
    in a first operating state in an operating cycle, control the first switch, the fourth switch, the sixth switch, the seventh switch, the ninth switch, the sixteenth switch, and the eighteenth switch to be turned on, and control other switches to be turned off;
    in a second operating state in the operating cycle, control the sixth switch and the eighth switch to be turned on, and control other switches to be turned off;
    in a third operating state in the operating cycle, control the second switch, the third switch, the fifth switch, the eighth switch, the tenth switch, the fifteenth switch, and the seventeenth switch to be turned on, and control other switches to be turned off; and
    in a fourth operating state in the operating cycle, control the sixth switch and the eighth switch to be turned on, and control other switches to be turned off, and wherein:
    the first switch, the second switch, the third switch, the fourth switch, the fifth switch, the seventh switch, the ninth switch, the tenth switch, the fifteenth switch, the sixteenth switch, the seventeenth switch, and the eighteenth switch are all turned on and off alternately with the first duty cycle D, and the sixth switch and the eighth switch are turned on and off alternately with a second duty cycle (1-D) complementary to the first duty cycle D so that the ratio of the voltage at the input terminal to the voltage at the output terminal is 2N:D, and N is an odd number greater than or equal to 3.

12. The voltage conversion circuit of claim 1, wherein:
    the second energy storage branch further comprises a seventh capacitor, an eighth capacitor, an eleventh switch and a twelfth switch, and the third energy storage branch also includes a ninth capacitor, a tenth capacitor, a thirteenth switch and a fourteenth switch, and wherein:
    a first terminal of the seventh capacitor is connected to a second terminal of the eleventh switch and a third terminal of the twelfth switch;
    a second terminal of the seventh capacitor is connected to the second terminal of the second inductor;
    a third terminal of the eleventh switch is connected to a first terminal of the third capacitor;
    a second terminal of the twelfth switch is connected to a first terminal of the eighth capacitor;
    a second terminal of the eighth capacitor is connected to the first terminal of the first inductor;
    a first terminal of the ninth capacitor is connected to a second terminal of the thirteenth switch and a third terminal of the fourteenth switch;
    a second terminal of the ninth capacitor is connected to the first terminal of the first inductor;
    a third terminal of the thirteenth switch is connected to the first terminal of the fourth capacitor;
    a second terminal of the fourteenth switch is connected to a first terminal of the tenth capacitor;
    a second terminal of the tenth capacitor is connected to the first terminal of the second inductor;
    when N is an even number greater than or equal to 2, the second terminal of the twelfth switch is further connected to the third terminal of the fifth switch, and the second terminal of the fourteenth switch is also connected to the third terminal of the seventh switch;
    when N is an odd number greater than or equal to 3, the second terminal of the twelfth switch is further connected to the third terminal of the ninth switch, and the second terminal of the fourteenth switch is further connected to the third terminal of the tenth switch; and
    the controller is connected to a first terminal of the eleventh switch, a first terminal of the twelfth switch, a first terminal of the thirteenth switch, and the first terminal of the fourteenth switch; and
    the first energy storage branch further comprises an eleventh capacitor, a fifteenth switch, a sixteenth switch, a seventeenth switch and an eighteenth switch, and wherein:
    a third terminal of the fifteenth switch is connected to the input terminal;

a second terminal of the fifteenth switch is connected to a first terminal of the eleventh capacitor and a third terminal of the sixteenth switch;

a second terminal of the sixteenth switch is connected to the first terminal of the fourth capacitor;

a second terminal of the eleventh capacitor is connected to a second terminal of the seventeenth switch and a third terminal of the eighteenth switch;

a second terminal of the eighteenth switch is grounded;

a third terminal of the seventeenth switch is connected to the first terminal of the third capacitor; and the controller is connected to a first terminal of the fifteenth switch, a first terminal of the sixteenth switch, a first terminal of the seventeenth switch, and a first terminal of the eighteenth switch.

13. The voltage conversion circuit of claim 12, wherein the controller is further configured to:

in a first operating state in an operating cycle, control the first switch, the fourth switch, the fifth switch, the eighth switch, the eleventh switch, and the fourteenth switch, the sixteenth switch and the eighteenth switch to be turned on, and control other remaining switches to be turned off;

in a second operating state in the operating cycle, control the sixth switch and the eighth switch to be turned on, and control other remaining switches to be turned off;

In a third operating state in the operating cycle, control the second switch, the third switch, the sixth switch, the seventh switch, the twelfth switch, the thirteenth switch, the fifteenth switch and the seventeenth switch to be turned on, and control other remaining switches to be turned off; and in a fourth operating state in the operating cycle, control the sixth switch and the eighth switch to be turned on, and control other remaining switches to be turned off, and wherein:

the first switch, the second switch, the third switch, the fourth switch, the fifth switch, the seventh switch, the eleventh switch, the twelfth switch, the thirteenth switch, the fourteenth switch, the fifteenth switch, the sixteenth switch, the seventeenth switch, and the eighteenth switch are all turned on and off alternately with the first duty cycle D, and the sixth switch and the eighth switch are turned on and off alternately with a second duty cycle (1-D) complementary to the first duty cycle D so that the ratio of the voltage at the input terminal to the voltage at the output terminal is 2N:D, and N is an even number greater than or equal to 4.

14. The voltage conversion circuit of claim 12, wherein the controller is further configured to:

in a first operating state in an operating cycle, control the first switch, the fourth switch, the sixth switch, the seventh switch, the ninth switch, the eleventh switch, the fourteenth switch, the sixteenth switch, and the eighteenth switch to be turned on, and control other remaining switches to be turned off;

in a second operating state in the operating cycle, control the sixth switch and the eighth switch to be turned on, and control other remaining switches to be turned off;

in a third operating state in the operating cycle, control the second switch, the third switch, the fifth switch, the eighth switch, the tenth switch, the twelfth switch, the thirteenth switch, the fifteenth switch, and the seventeenth switch to be turned on, and control other remaining switches to be turned off; and In a fourth operating state in the operating cycle, control the sixth switch and the eighth switch to be turned on, and control other remaining switches to be turned off, and wherein:

the first switch, the second switch, the third switch, the fourth switch, the fifth switch, the seventh switch, the ninth switch, the tenth switch, the eleventh switch, the twelfth switch, the thirteenth switch, the fourteenth switch, the fifteenth switch, the sixteenth switch, the seventeenth switch, the eighteenth switch are turned on and off alternately at the first duty cycle D, and the sixth switch and the eighth switch are turned on and off alternately at a second duty cycle (1-D) complementary to the first duty cycle D so that the ratio of the voltage at the input terminal to the voltage at the output terminal is 2N:D, and N is an odd number greater than or equal to 5.

15. The voltage conversion circuit of claim 1, wherein the first duty cycle is less than or equal to 50%.

* * * * *